US011035826B1

(12) United States Patent
Fernald et al.

(10) Patent No.: US 11,035,826 B1
(45) Date of Patent: Jun. 15, 2021

(54) METHOD AND APPARATUS FOR DETERMINING GVF—GAS VOLUME FRACTION—FOR AERATED FLUIDS AND LIQUIDS IN FLOTATION TANKS, COLUMNS, DRUMS, TUBES, VATS

(71) Applicant: CiDRA CORPORATE SERVICES INC., Wallingford, CT (US)

(72) Inventors: Mark R. Fernald, Enfield, CT (US); Timothy J. Bailey, Longmeadow, MA (US); Douglas H. Loose, Southington, CT (US); James M. Sullivan, East Hampton, CT (US); John Biesak, Durham, CT (US); Alan D. Kersey, South Glastonbury, CT (US); Michael A. Davis, Glastonbury, CT (US)

(73) Assignee: CIDRA CORPORATE SERVICES, INC., Wallingford, CT (US)

( * ) Notice: Subject to any disclaimer, the term of this patent is extended or adjusted under 35 U.S.C. 154(b) by 0 days.

(21) Appl. No.: 17/144,333

(22) Filed: Jan. 8, 2021

Related U.S. Application Data

(63) Continuation of application No. 13/583,062, filed as application No. PCT/US2011/027731 on Mar. 9, 2011.

(Continued)

(51) Int. Cl.
*G01N 29/024* (2006.01)
*B03D 1/02* (2006.01)
(Continued)

(52) U.S. Cl.
CPC ............ *G01N 29/02* (2013.01); *B03D 1/028* (2013.01); *G01F 1/7082* (2013.01); *G01F 1/712* (2013.01);
(Continued)

(58) Field of Classification Search
CPC ......... G01N 2291/02433; G01N 29/02; G01N 29/024; B03D 1/028
See application file for complete search history.

(56) References Cited

U.S. PATENT DOCUMENTS

| 4,523,465 A | 6/1985 | Fasching et al. |
|---|---|---|
| 4,869,349 A | 9/1989 | Minear et al. |

(Continued)

FOREIGN PATENT DOCUMENTS

| JP | 198358019557 | 2/1983 |
|---|---|---|
| JP | 199204254755 | 9/1992 |
| JP | 6022947 | 11/2016 |

OTHER PUBLICATIONS

JP198358019557 English Language Abstract (1 page).
JP199204254755 English Language Abstract (1 page).
English language Abstract of WO2011119335A2 attached.

*Primary Examiner* — Herbert K Roberts
(74) *Attorney, Agent, or Firm* — Ware, Fressola, Maguire & Barber LLP

(57) ABSTRACT

The invention provides a signal processor that receives a signal containing information about an acoustic signal that is generated by at least one acoustic transmitter, that travels through an aerated fluid in a container, and that is received by at least one acoustic receiver arranged in relation to the container, including inside the container; and determines the gas volume fraction of the aerated fluid based at least partly on the speed of sound measurement of the acoustic signal that travels through the aerated fluid in the container. The signal processor also sends an output signal containing information about the gas volume fraction of the aerated fluid. The signal processor may be configured together with at least one acoustic transmitter, the at least one acoustic receiver, or both.

18 Claims, 15 Drawing Sheets

Flotation tank with two receivers and one source

Related U.S. Application Data

(60) Provisional application No. 61/312,023, filed on Mar. 9, 2010, provisional application No. 61/311,993, filed on Mar. 9, 2010, provisional application No. 61/342,585, filed on Apr. 16, 2010, provisional application No. 61/448,443, filed on Mar. 2, 2011.

(51) Int. Cl.
*G01F 1/74* (2006.01)
*G01N 29/02* (2006.01)
*G01L 11/04* (2006.01)
*G01F 1/708* (2006.01)
*G01F 1/712* (2006.01)

(52) U.S. Cl.
CPC ............... *G01F 1/74* (2013.01); *G01L 11/04* (2013.01); *G01N 29/024* (2013.01); *G01N 2291/011* (2013.01); *G01N 2291/02433* (2013.01)

(56) References Cited

U.S. PATENT DOCUMENTS

| | | |
|---|---|---|
| 6,227,039 B1 | 5/2001 | Te'eni et al. |
| 6,279,379 B1 | 8/2001 | Logue et al. |
| 6,354,147 B1 | 3/2002 | Gysling et al. |
| 6,587,798 B2 | 7/2003 | Kersey et al. |
| 7,134,320 B2 | 11/2006 | Gysling et al. |
| 7,384,180 B2 | 6/2008 | Jarvinen et al. |
| 7,426,852 B1 * | 9/2008 | Rothman ............ G01N 29/024 702/54 |
| 7,624,652 B2 | 12/2009 | Wee et al. |
| 2001/0035312 A1 * | 11/2001 | Han ............ E21B 47/107 181/115 |
| 2003/0231930 A1 | 12/2003 | Allen et al. |
| 2004/0194539 A1 | 10/2004 | Gysling |
| 2004/0199340 A1 | 10/2004 | Kersey |
| 2005/0061060 A1 | 3/2005 | Gysling et al. |
| 2007/0131033 A1 * | 6/2007 | Stencel ............ G01N 29/4427 73/587 |
| 2007/0157737 A1 | 7/2007 | Gysling et al. |
| 2009/0206174 A1 | 8/2009 | Arnaud et al. |
| 2009/0263555 A1 | 10/2009 | Tapfer et al. |
| 2011/0169629 A1 | 7/2011 | Cooper |
| 2011/0237670 A1 | 9/2011 | Klamer |

\* cited by examiner

Apparatus, 20

At least one acoustic transmitter 22 arranged in relation to a container having aerated fluid therein and configured to generate an acoustic signal that travels through the aerated fluid At least one acoustic receiver probe 24 arranged in relation to the container, including inside the container, and configured to receive the acoustic signal and provide a signal containing information about the acoustic signal generated by the at least one acoustic transmitter Signal processor 26 configured to > Receive the signal containing information about an acoustic signal that is generated by at least one acoustic transmitter, that travels through the aerated fluid in the container, and that is received by the at least one acoustic receiver probe arranged in relation to the container, including inside the container;
>
> Determine the gas volume fraction of the aerated fluid based at least partly on the speed of sound measurement of the acoustic signal that travels through the aerated fluid in the container;
>
> Provide an output signal containing information about a chemical additive to be added to the container in order to control a process related to the aerated fluid based at least partly on the gas volume fraction of the aerated fluid that is determined — 26a One or more other modules, components, etc. for implementing other functionality associated with the apparatus

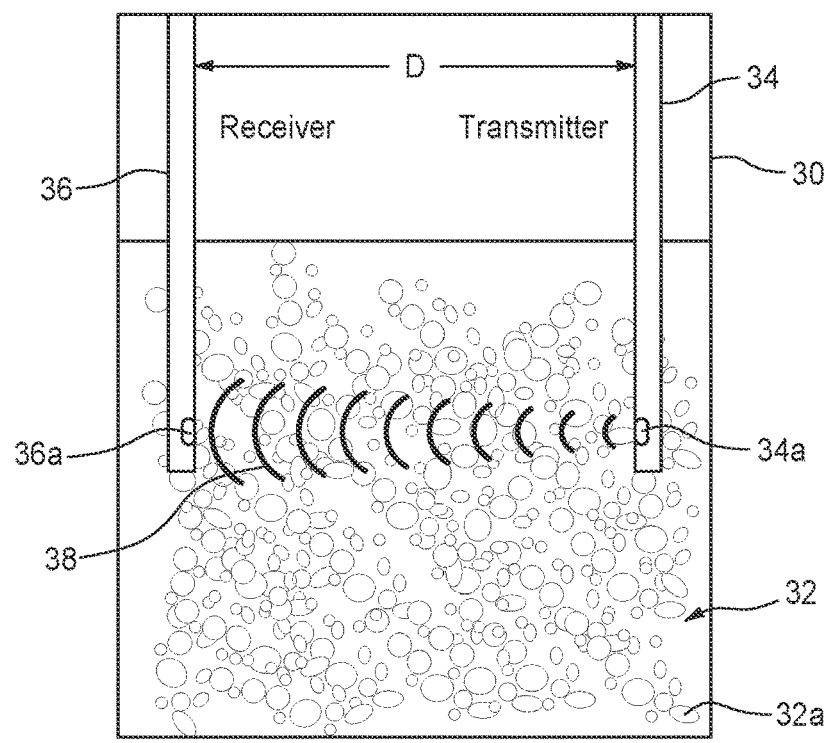
FIG. 2a: Flotation tanks with probes
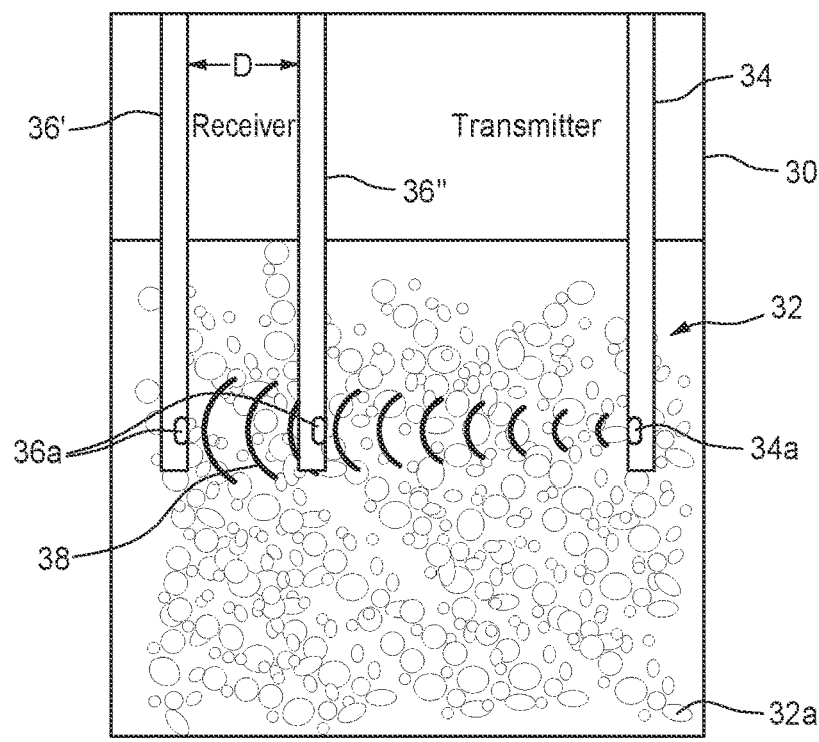
FIG. 2b: Flotation tanks with two receivers and one source

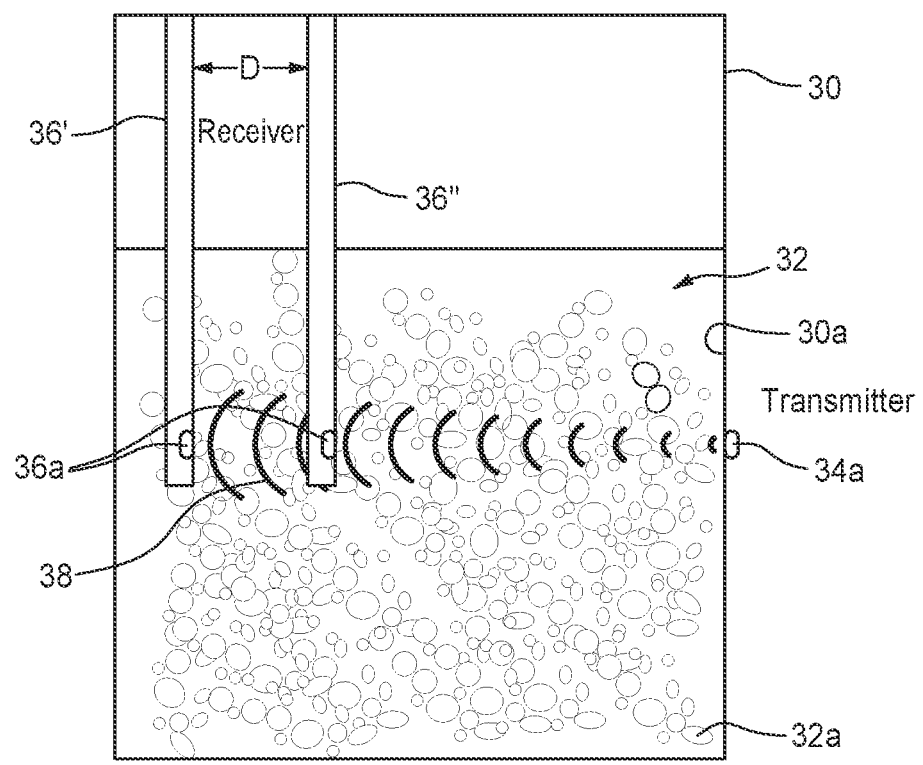
FIG. 2c: Flotation tank with two receivers and one source

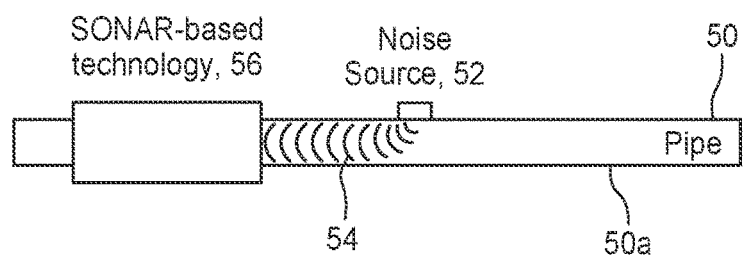
*FIG. 4a*
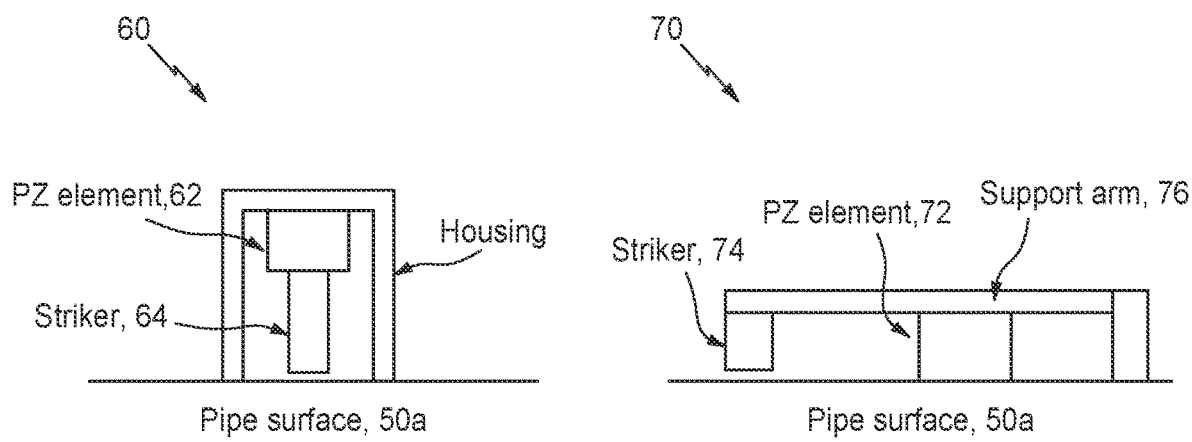
*FIG. 4b(i)*    *FIG. 4b(ii)*

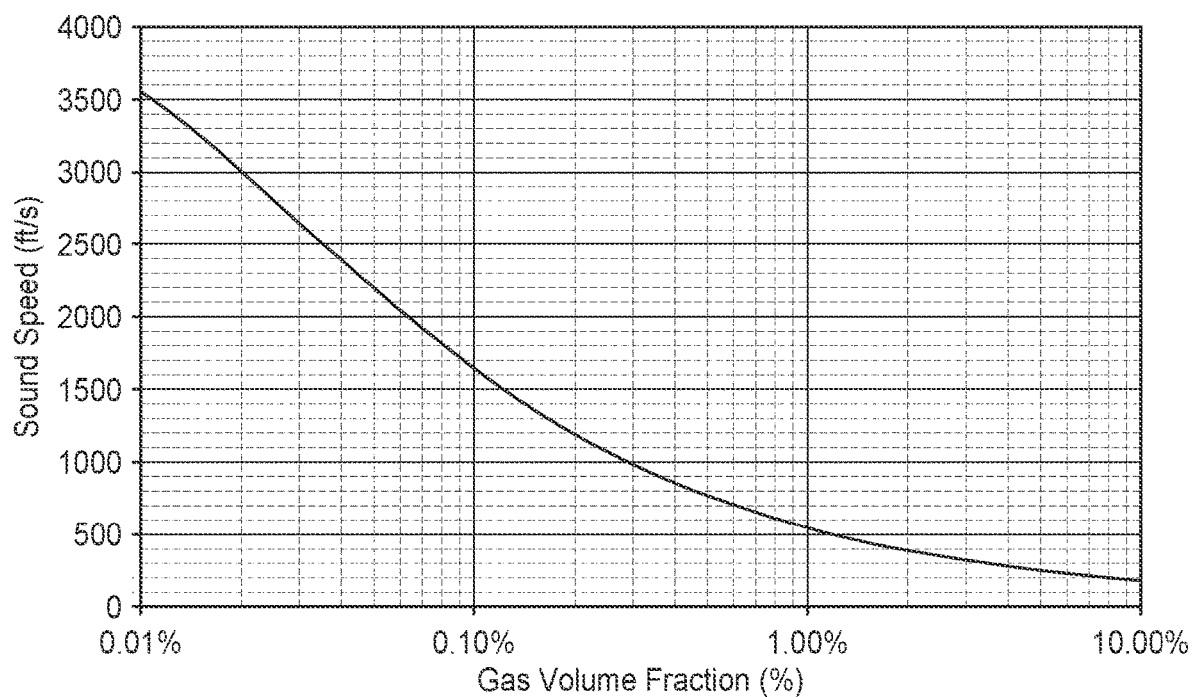
FIG. 6a: Speed of Sound vs. Air Content
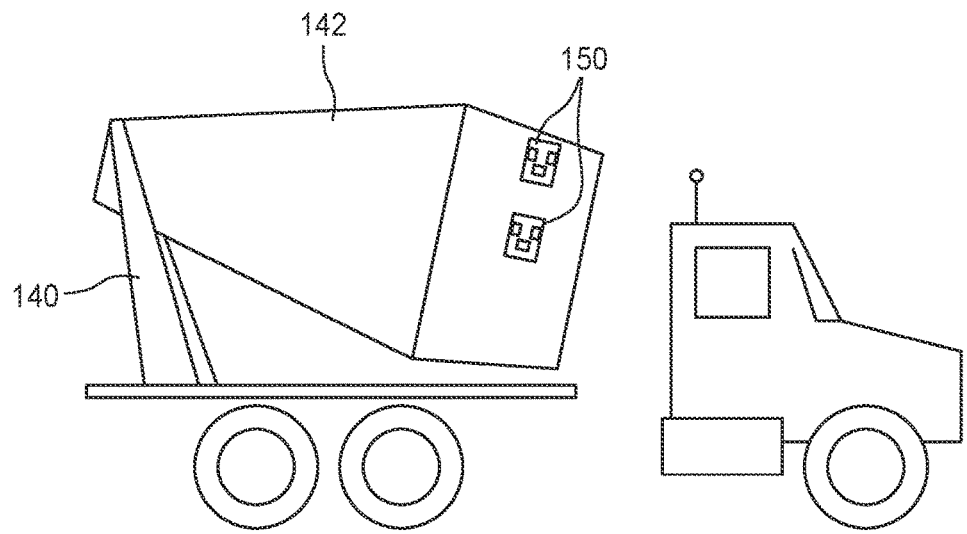
FIG. 6b: Bolted Hatch Cover on Concrete Mixer Drum

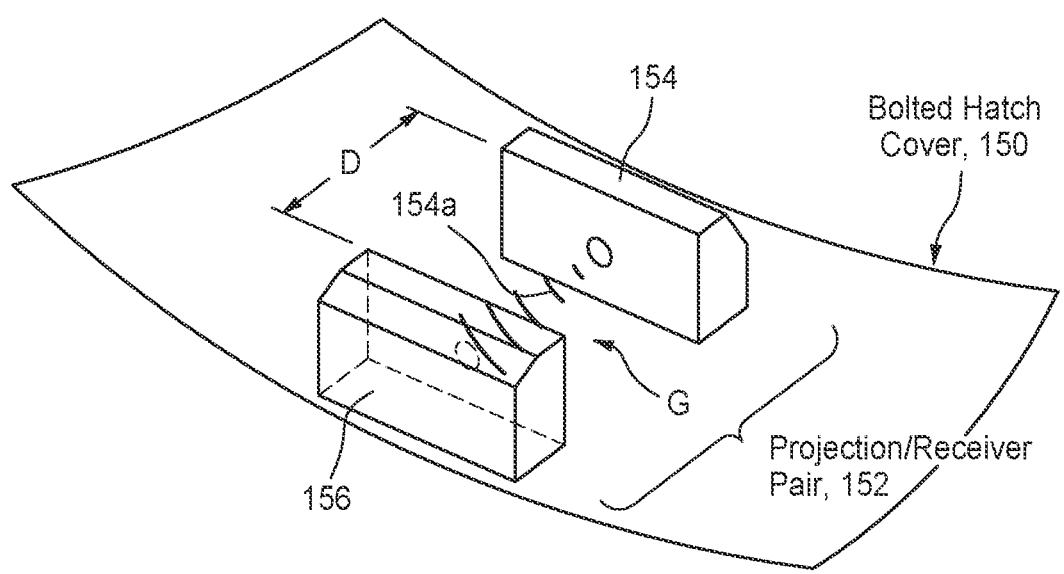
*FIG. 6c*: Acoustic Projector/Receiver Pair Inside Hatch Cover

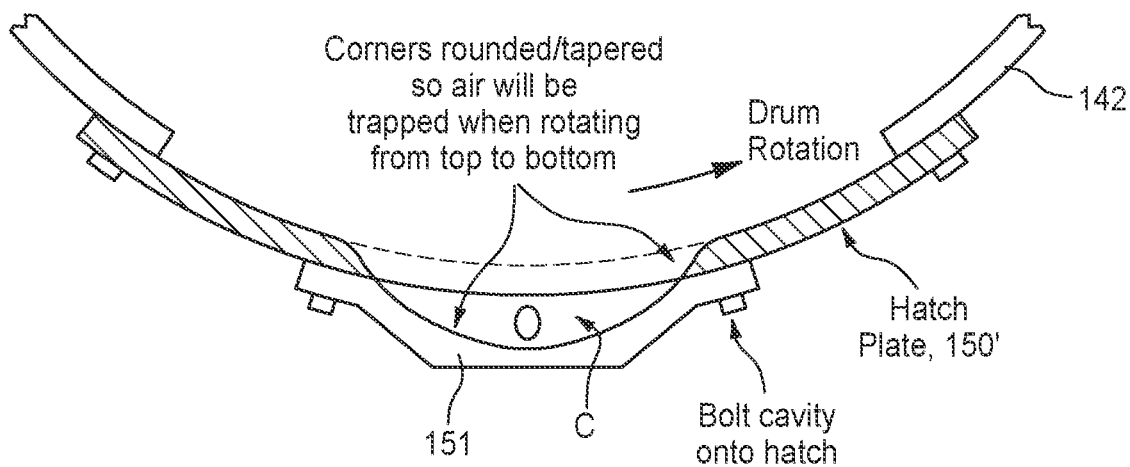
FIG. 6d
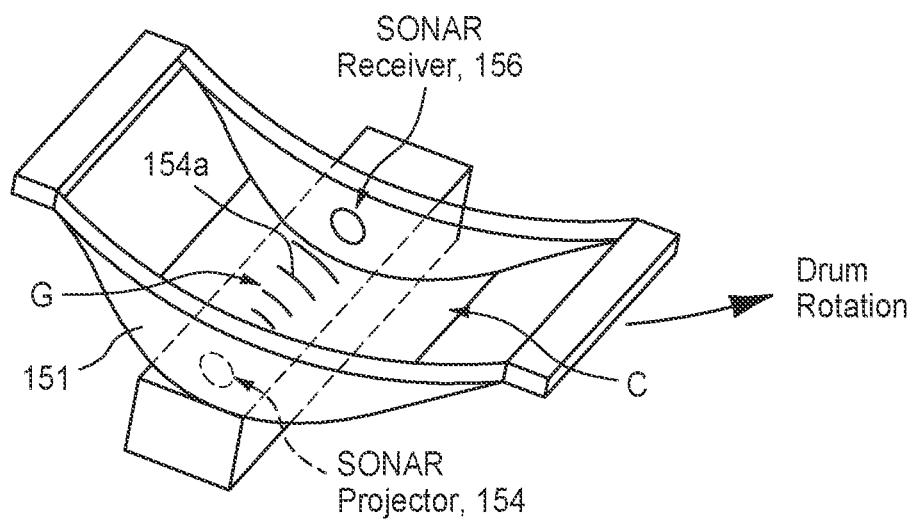
FIG. 6e: Cavity installed on Hatch Cover with Acoustic Projector/Receiver

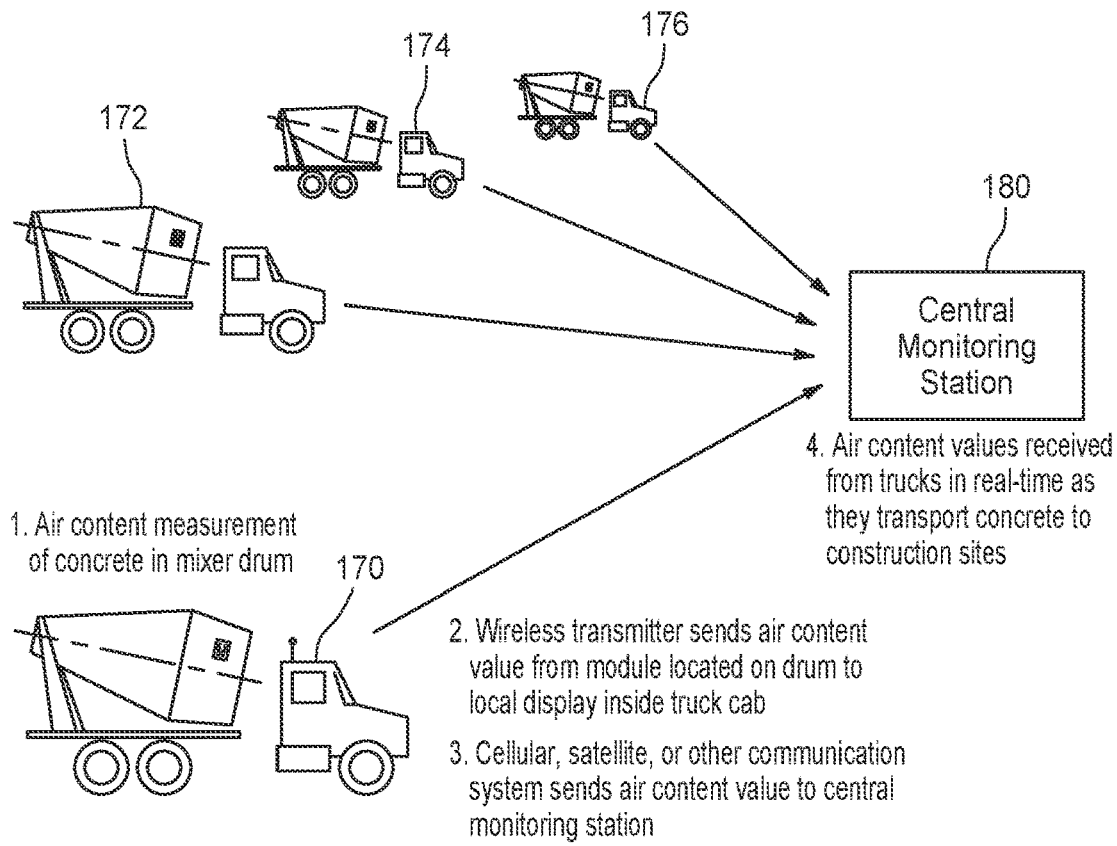
FIG. 6f: Central Monitoring of Air Content of Ready-Mix Truck Fleet
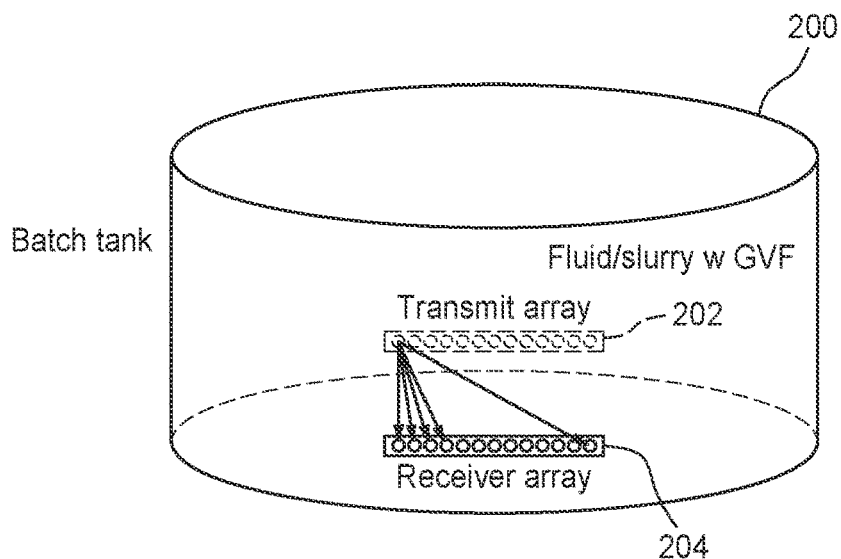
FIG. 7a: Multipath acoustic GVF sensing in a bulk fluid or slurry

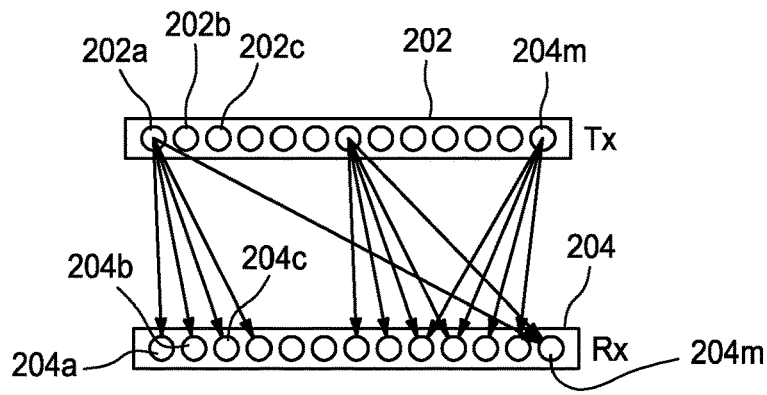
FIG. 7b: Open path acoustic array
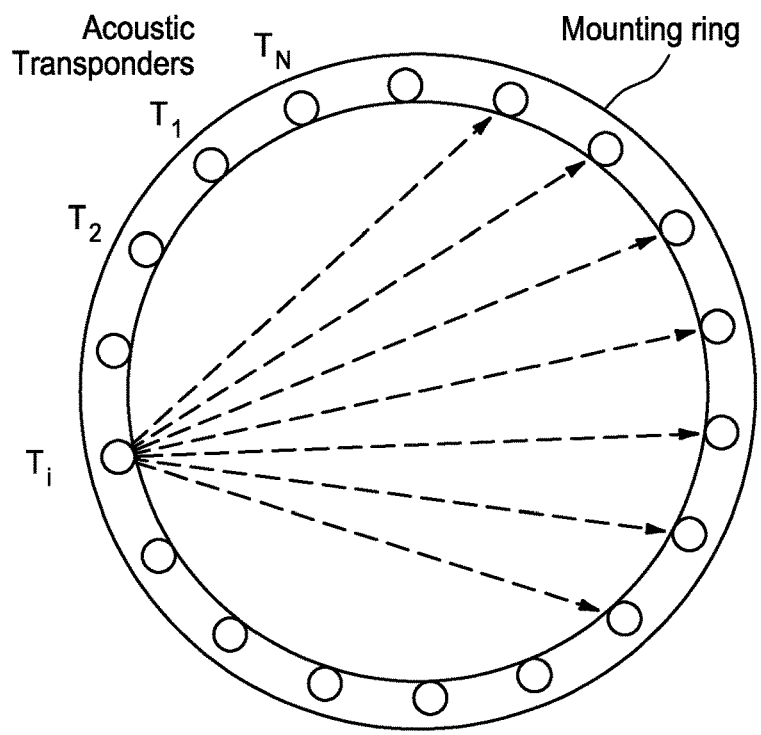
FIG. 7c: Circular/ring based sensor for immersion in bulk fluid

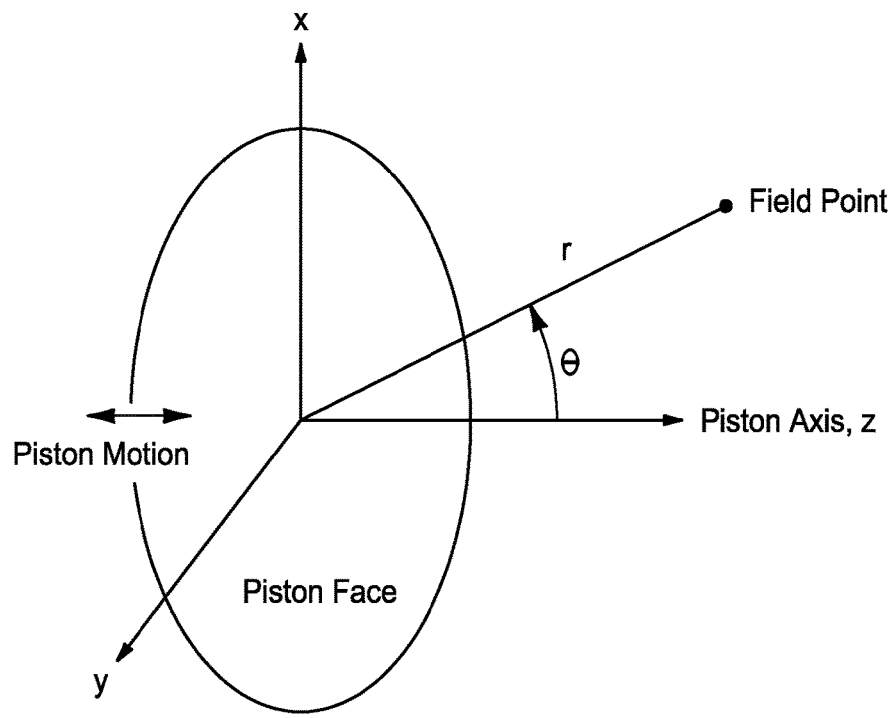
FIG. 8a: Circular Piston Geometry
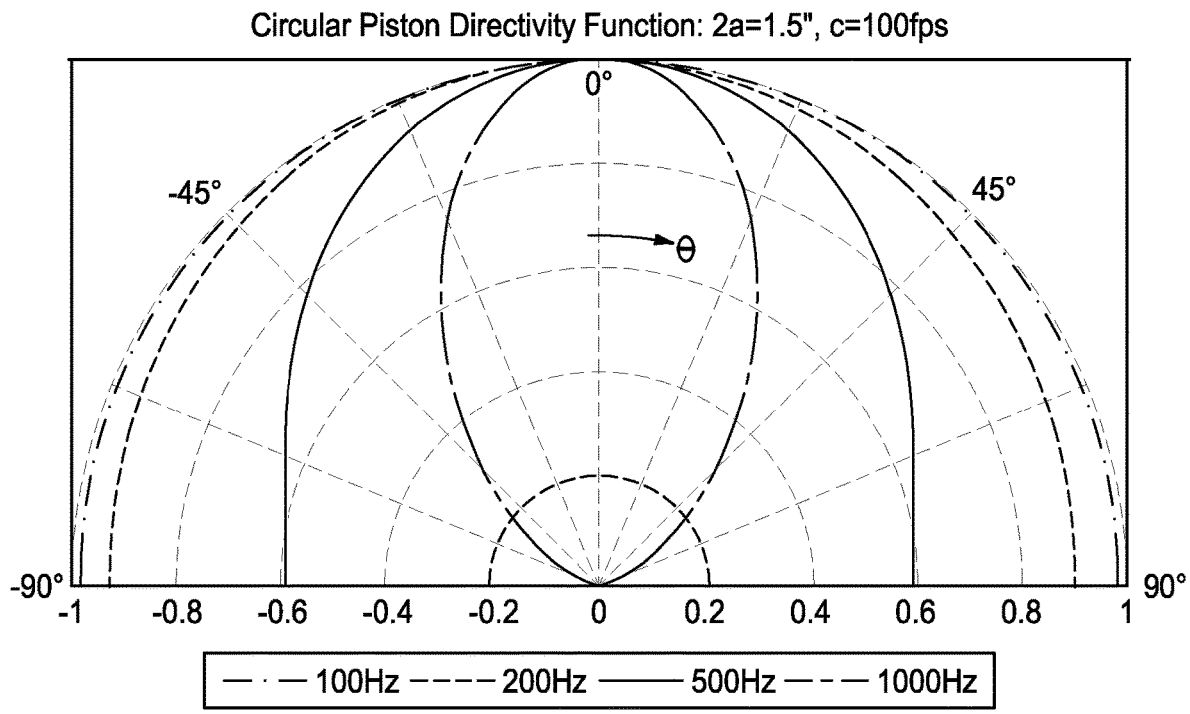
FIG. 8b: Directivity Factor Amplitude for Circular Piston

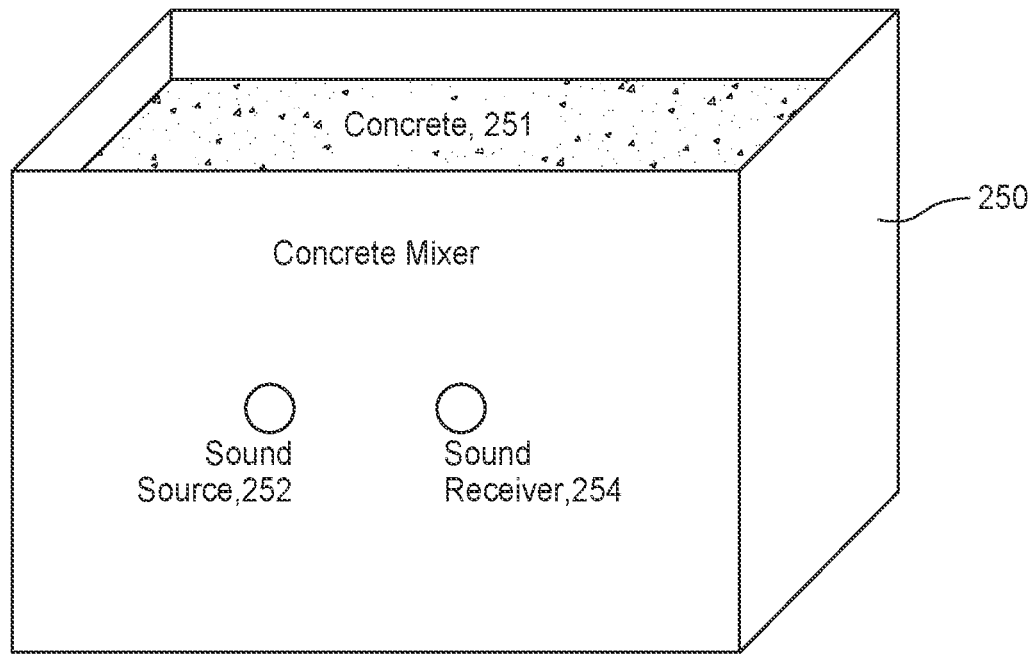
FIG. 8c: Sound Source and Receiver Mounted On Wall of Concrete Mixer
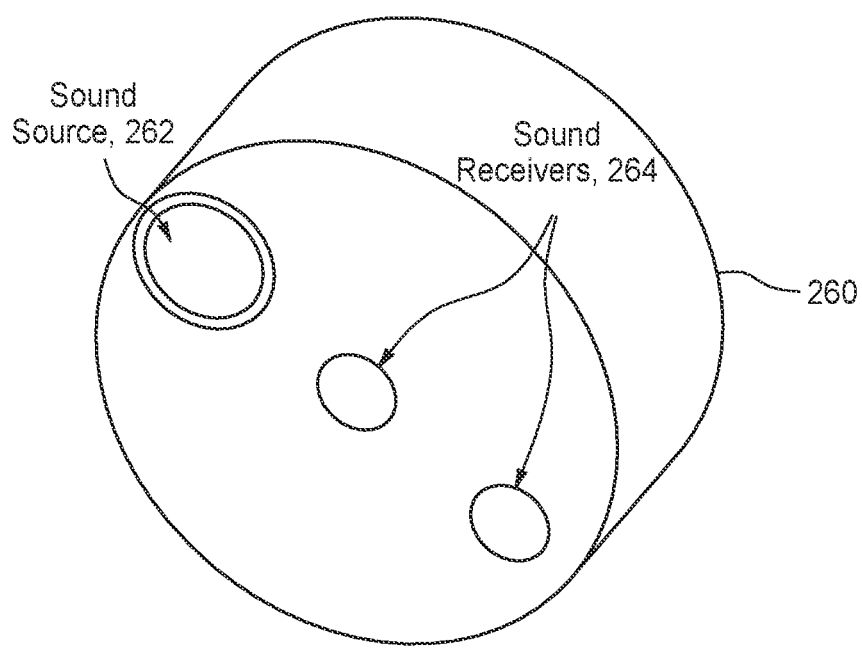
FIG. 8d: Integrated Sound Source and Two Receivers

METHOD AND APPARATUS FOR DETERMINING GVF—GAS VOLUME FRACTION—FOR AERATED FLUIDS AND LIQUIDS IN FLOTATION TANKS, COLUMNS, DRUMS, TUBES, VATS

CROSS-REFERENCE TO RELATED APPLICATIONS

This application is a continuation of, and claims benefit to, patent application Ser. No. 13/583,062, filed 9 Mar. 2011, that corresponds to PCT application no. PCT/US2011/027731, which itself claims benefit to provisional patent application Ser. No. 61/311,993, filed 9 Mar. 2010 (WFVA/CiDRA file nos. 712-2.338/35); and Ser. No. 61/312,023, filed 9 Mar. 2010 (WFVA/CiDRA file nos. 712-2.340/37), Ser. No. 61/342,585, filed 16 Apr. 2010 (WFVA/CiDRA file nos. 712-2.345/40-1), and Ser. No. 61/448,443, filed 2 Mar. 2011 (WFVA/CiDRA file nos. 712-2.353/47 and 51), which are all incorporated by reference in their entirety.

BACKGROUND OF THE INVENTION

1. Field of Invention

This invention relates to a technique for determining gas volume fraction (GVF) of an aerated fluid or liquid in a flotation tank, column or container; and more particularly related to a technique for determining gas volume fraction (GVF) of an aerated fluid or liquid in a flotation tank, column or container in order to control a process related to the aerated fluid or liquid.

2. Description of Related Art

In the prior art, the use of a method for the determination of the flow rate of the medium through a measurement of the velocity of convecting vortical pressure instabilities, and the composition of a two-phase flow through the determination of the speed of sound of the medium, are known. As the composition of the flow varies between the two extremes of 100% of one fluid to 100% of the other, the speed of sound varies in a deterministic way between the values of sound speed in the two respective materials. In the known techniques, the determination of the speed of sound was made using 'passive' listening of the sound propagating in the flow stream.

In the prior art, a number of techniques have been developed that rely on measuring the speed of sound through a material flowing through a pipe. These techniques include using a known SONAR-based GVF meter, density meter and potential mass fraction meter. In these techniques, a passive array-based sensor system is used to detect the presence and speed of acoustics traveling through the materials contained within a pipe. These materials can range from single phase homogeneous fluids to two or three phase mixtures of gases, liquids and solids. Since the measurements system is passive it relies on acoustics produced externally for the measurement. These acoustics can often times come from other equipment in or attached to the pipe such as pumps or valves.

Moreover, in these known techniques many times chemical additives may be added, including to a known flotation process in mineral processing to aid in the separation of the ore. The chemicals, known as frothers, control the efficiency of the flotation process by enhancing the properties of the air bubbles. An important parameter in flotation optimization is the gas volume fraction within a flotation cell. U.S. Pat. No. 7,426,852 B1, which is hereby incorporated by reference in its entirety, discloses approaches to make this measurement, and discloses a technique whereby the speed of sound in the aerated fluid is locally measured using a waveguide (pipe) in conjunction with a SONAR-based array. From the speed of sound measurement, the gas volume fraction can be calculated.

By way of example, see other techniques related to the use of such SONAR-based technology disclosed, e.g., in whole or in part in U.S. Pat. Nos. 7,165,464; 7,134,320; 7,363,800; 7,367,240; and 7,343,820, all of which are incorporated by reference in their entirety.

Moreover, air is a very important component of many materials, such as viscous liquids, slurries or solids. In particular, air is a critical ingredient when making concrete because it greatly improves the cured product damage resistance to freeze/thaw cycles. Chemical admixtures are typically added during mixing to create, entrain and stabilize billions of small air bubbles within the concrete. However, the entrained air in concrete has the disadvantage of reducing strength so there is always a trade-off to determine the right amount of air for a particular application. In order to optimize certain properties of concrete, it is important to control the entrained air present in the wet (pre-cured) concrete. Current methods for measuring the entrained air can sometimes be slow and cumbersome and additionally can be prone to errors. Moreover, the durability of concrete may be enhanced by entraining air in the fresh mix. This is typically accomplished through the addition of chemical admixes. The amount of admix is usually determined through empirical data by which a "recipe" is determined. Too little entrained air reduces the durability of the concrete and too much entrained air decreases the strength. Typically the nominal range of entrained air is about 5-8% by volume, and can be between 4% and 6% entrained air by volume in many applications. After being mixed in the mixer box, the concrete is then released to the truck. The level of entrained air is then measured upon delivery of the mix to the site. The draw back of the current method is that the mix is committed to the truck without verification of that the air level in the mix is within specification.

The present invention makes important contributions to this current state of the art.

SUMMARY OF THE INVENTION

The present invention provides new techniques for determining gas volume fraction (GVF) for an aerated fluid or liquid in a container like a flotation tank, column or a vat.

According to some embodiments of the present invention, the apparatus may comprise a signal processor configured to:

receive a signal containing information about an acoustic signal that is generated by at least one acoustic transmitter, that travels through an aerated fluid in a container, and that is received by at least one acoustic receiver arranged in relation to the container, including a probe arranged inside the container; and determine the gas volume fraction of the aerated fluid based at least partly on the speed of sound measurement of the acoustic signal that travels through the aerated fluid in the container.

According to some embodiments, the apparatus may comprise the signal processor in combination with the at least one acoustic transmitter, the at least one acoustic receiver, or both, where the at least one acoustic transmitter may be arranged in relation to the container having the aerated fluid therein and configured to generate the acoustic signal that travels through the aerated fluid, and where the at least one acoustic receiver may be arranged in relation to the container, including inside the container, and configured to receive the acoustic signal and provide the signal containing information about the acoustic signal generated by the at least one acoustic transmitter to the signal processor.

The present invention may also include one or more of the following features: The signal processor may be configured to determine the speed of sound measurement based at least partly on a known separation distance between the at least one acoustic transmitter and the at least one acoustic receiver or the receiver probe, including to determine the speed of sound measurement based at least partly on the at least one acoustic transmitter and the acoustic receiver or receiver probe being arranged at the same height in relation to the container. The signal processor may be configured to determine the speed of sound measurement based at least partly on the at least one acoustic transmitter emitting the acoustic signal at a frequency in a proper frequency range so that entrained air modifies the speed of sound in the aerated fluid. The signal processor may be configured to receive signals containing information about the acoustic signal that is received by two acoustic receiver, including two receiver probes arranged inside the container. The signal processor may be configured to determine the speed of sound measurement based at least partly on knowing the distance between the two acoustic receivers. The signal processor may be configured to record an elapsed time between pulse generation and detection and determine the speed of sound measurement based at least partly on the same.

The signal processor may be configured to provide an output signal containing information about the gas volume fraction of the aerated fluid, that may be used to control the process, including information about providing a chemical additive to the aerated fluid in the container.

According to some embodiments, the present invention may form part of a flotation process in mineral processing to aid in the separation of ore, including adding chemicals known as frothers to control the efficiency of the flotation process by enhancing the properties of air bubbles, or a mixing process for making concrete, including mixing concrete in a ready mix truck or in a stationary concrete mixer box, or a food process, including adding lysene for producing ice cream, or a cosmetics process for producing make-up, or a mixing process for producing paint or coating fluid.

According to some embodiments of the present invention, the signal processor may be configured to receive the signal containing information about acoustic signals generated by driving a piezoelectric material or a mechanical impulse.

According to some embodiments of the present invention, the at least one acoustic transmitter may be arranged on an outside wall of the container, or on an inside wall of the container, or in the container but not attached to the wall of the container.

According to some embodiments of the present invention, the at least one acoustic transmitter may provide an omni-directional signal.

According to some embodiments of the present invention, the container may be a flotation tank, a flotation tank or a vat.

According to some embodiments, the apparatus may comprise a device configured to receive the output signal, and also configured to add the chemical additive to the container in order to control the process related to the aerated fluid in a closed loop system.

According to some embodiments, the at least one acoustic transmitter and the at least one acoustic receiver may take the form of a projector/receiver pair separated by a small distance and attached to a drum inspection hatch of a ready mix truck, including where the projector/receiver pair is installed through the drum inspection hatch so as to be inside the cavity of a mixer drum of the ready mix truck, or where the projector/receiver pair is installed on a separate hatch plate configured to form a cavity, the projector/receiver pair is installed in the cavity, and the hatch plate is configured to the hatch cover so that the projector/receiver pair is exposed to the concrete inside a mixer drum.

According to some embodiments, the apparatus may comprise a wireless transmitter configured to provide a wireless signal containing information about an air content value of the concrete, including to a local display and/or communications module on the mixer truck.

According to some embodiments, the at least one acoustic transmitter and acoustic receiver may take the form of a projector/receiver pair separated by a small distance and mounted on a chute that is used to pour concrete for continuously measuring the concrete being poured.

According to some embodiments, the signal processor may be configured to receive signals containing information about the acoustic signal that is generated by the at least one acoustic transmitter, that travels through the aerated fluid in the container, and that is received by multiple acoustic receivers or receiver probes, including where the signal processor is configured to determine the gas volume fraction of the aerated fluid based at least partly on multipath interrogation of each measurement point, where each acoustic receiver or receiver probe can be used to detect a respective signal from each acoustic transmitter. The signal processor may be configured to receive signals containing information about acoustic signals that are generated by multiple acoustic transmitters, that travel through the aerated fluid in the container, and that are received by one or more acoustic receivers or receiver probes in a receiver array, including where the signal processor is configured to determine the gas volume fraction of the aerated fluid based at least partly on multipath interrogation of each measurement point, where each acoustic receiver or receiver probe can be used to detect a respective signal from each acoustic transmitter, or where the signal processor is configured to receive signals containing information about the acoustic signals that are generated by multiple acoustic transmitters in the transmitter array having each acoustic transmitter selectively encoded with a different frequency, slice of spectrum, chirp/modulation characteristic allowing each channel to be individually analyzed, that travel through the aerated fluid in the container, and that are received by an array of acoustic receivers or receiver probes, or where the signal processor is configured to receive signals containing information about the acoustic signals that are generated by the array of acoustic transmitters energized with pseudo noise sources so delay-correlation techniques can be used to detect the transmit time for each transmitter-to-receiver path, that travel through the aerated fluid in the container, and that are received by the array of acoustic receivers or receiver probes.

According to some embodiments of the present invention, the at least one acoustic transmitter arranged on the outside of the container may operate through the wall of the container, including being inserted in a port in the wall that allows contact with the aerated fluid, and including where the at least one acoustic transmitter is configured to generate low frequency acoustics by driving a diaphragm, including by pressure or mechanical/electrical excitation, used to propagate a sound signal into the aerated fluid.

According to some embodiments of the present invention, the method may comprise receiving a signal containing information about an acoustic signal that is generated by at least one acoustic transmitter, that travels through an aerated fluid that forms part of a process in a container, and that is received by at least one acoustic receiver arranged in relation to the container, including a receiver probe arranged inside the container; and determining the gas volume fraction of the aerated fluid based at least partly on the speed of sound measurement of the acoustic signal that travels through the aerated fluid in the container. The method may also comprise providing an output signal containing information about the gas volume fraction of the aerated fluid, that may be used to control the process, including information about providing a chemical additive to the aerated fluid in the container.

According to some embodiments of the present invention, the apparatus may comprise means for receiving a signal containing information about an acoustic signal that is generated by at least one acoustic transmitter, that travels through an aerated fluid in a container, and that is received by at least one acoustic receiver arranged in relation to the container, including a receiver probe arranged inside the container; and means for determining the gas volume fraction of the aerated fluid based at least partly on the speed of sound measurement of the acoustic signal that travels through the aerated fluid in the container, where the means for implementing the associated functionalities is consistent with that specifically shown and described herein.

BRIEF DESCRIPTION OF THE DRAWING

The drawing includes FIGS. 1-8*d*, which are not drawn to scale, as follows:

FIG. 1*a* is a block diagram of apparatus according to some embodiment of the present invention.

FIG. 2*a* is a diagram of a flotation tank having aerated fluid or liquid therein and at least one acoustic transmitter and at least one acoustic receiver or receiver probe arranged inside a flotation tank, according to some embodiments of the present invention.

FIG. 2*b* is a diagram of a flotation tank having aerated fluid or liquid therein and at least one acoustic transmitter and two or more acoustic receivers or receiver probes all arranged inside the flotation tank, according to some embodiments of the present invention.

FIG. 2*c* is a diagram of a flotation tank having aerated fluid or liquid therein and at least one acoustic transmitter or source arranged on an outside wall of the container and two or more acoustic receivers or receiver probes arranged inside the flotation tank, according to some embodiments of the present invention.

FIG. 4*a* is a diagram of a pipe having at least one acoustic source for providing an acoustic signal through a material flowing in the pipe, according to some embodiments of the present invention.

FIG. 4*b*(i) is a diagram of a pipe surface having at least one acoustic source for providing an acoustic signal with a broadband frequency spectrum through a material flowing in the pipe, according to some embodiments of the present invention.

FIG. 4*b*(ii) is a diagram of a pipe surface having at least one acoustic source for providing an acoustic signal with a broadband frequency spectrum through a material flowing in the pipe, according to some embodiments of the present invention.

FIG. 6*a* is a graph of the speed of sound (ft/sec) through a wet concrete versus gas volume fraction (%) indicating the amount of air by volume contained in the wet concrete, according to some embodiments of the present invention.

FIG. 6*b* shows a bolted hatch cover on a concrete mixer drum, according to some embodiments of the present invention.

FIG. 6*c* shows an acoustic projector/receiver pair inside a hatch cover, according to some embodiments of the present invention.

FIG. 6*d* shows an acoustic projector/receiver pair arranged on a hatch plate having a cavity formed therein coupled to a hatch cover, according to some embodiments of the present invention.

FIG. 6*e* shows a hatch plate having a cavity formed therein coupled to a hatch cover with an acoustic projector/receiver pair, according to some embodiments of the present invention.

FIG. 6*f* shows a central monitoring station for monitoring of air content of a fleet of ready-mix trucks, according to some embodiments of the present invention.

FIG. 7*a* shows multipath acoustic GVF sensing in a bulk fluid or slurry, according to some embodiments of the present invention.

FIG. 7*b* shows an open path acoustic array having N acoustic transmitters arranged in relation to N acoustic receivers, where N is greater than 2, according to some embodiments of the present invention.

FIG. 7*c* shows a circular mounting ring based sensor for immersion in a bulk fluid having N acoustic transponders for arranging in a container having a bulk fluid or slurry, according to some embodiments of the present invention.

FIG. 8a shows a circular piston geometry in relation to X, Y and Z axes for a free-edged baffled circular piston with time-harmonic oscillation.

FIG. 8b shows a graph of directivity factor amplitude for a circular piston.

FIG. 8c shows a sound source and receiver mounted on a wall of a concrete mixer, according to some embodiments of the present invention.

FIG. 8d shows an integrated sound source and twp receivers mounted on a wall of a concrete mixer, according to some embodiments of the present invention.

DETAILED DESCRIPTION OF BEST MODE OF THE INVENTION

Figure 1B:
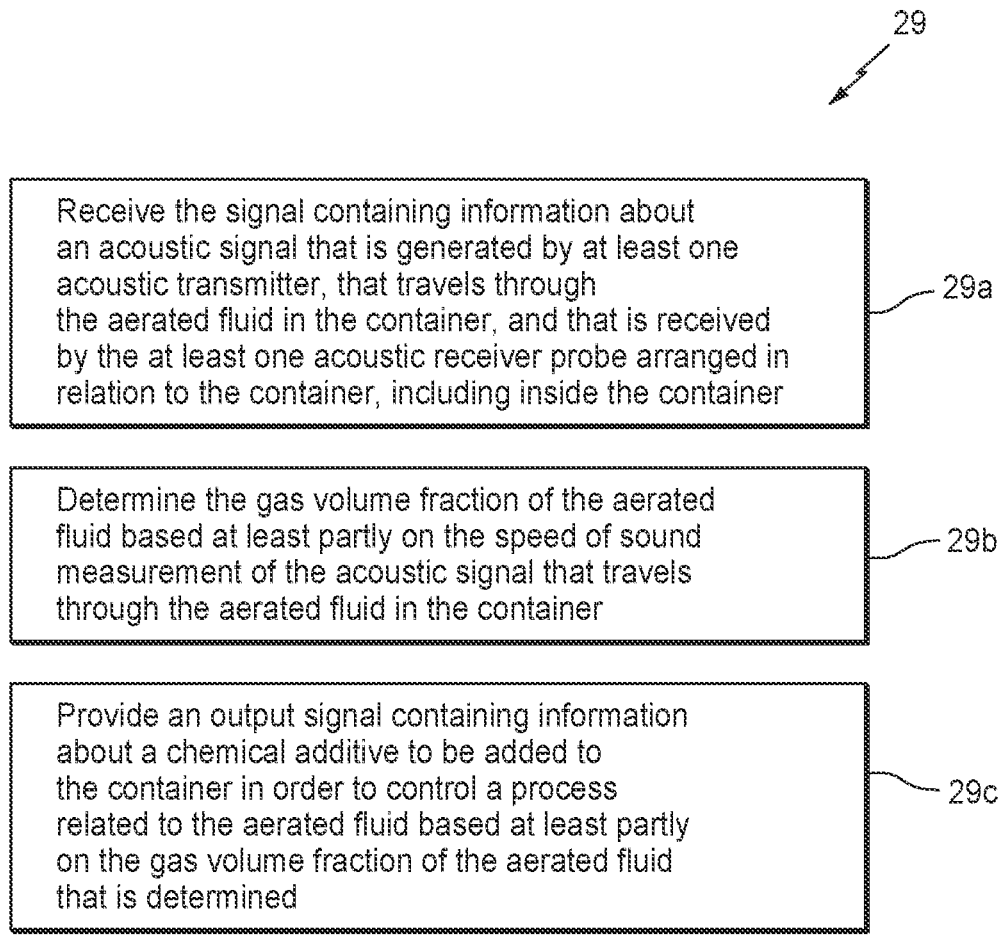
FIG. 1*b* is a block diagram of a flow chart of a method according to some embodiment of the present invention.

FIG. 1a shows apparatus generally indicated as 20 according to the present invention, which may include at least one acoustic transmitter 22, at least one acoustic receiver probe 24 and a signal processor 26.

Consistent with the embodiments shown and described in detail below, the at least one acoustic transmitter 22 may be arranged in relation to a container having aerated fluid therein and configured to generate an acoustic signal that travels through the aerated fluid, and the at least one acoustic receiver may be arranged in relation to the container, including a receiver probe 24 arranged inside the container, and configured to receive the acoustic signal and provide a signal containing information about the acoustic signal generated by the at least one acoustic transmitter 22. In operation, the signal processor 26 is configured to receive the signal containing information about the acoustic signal that is generated by the at least one acoustic transmitter 22, that travels through the aerated fluid in the container, and that is received by the at least one acoustic receiver or receiver probe 24 arranged inside the container. The signal processor 26 is also configured to determine the gas volume fraction of the aerated fluid based at least partly on the speed of sound measurement of the acoustic signal that travels through the aerated fluid in the container. The at least one signal processor 26 may also be configured to provide an output signal containing information about the gas volume fraction of the aerated fluid or liquid, or containing information to control a process being performed on the aerated fluid or liquid, or containing information about a chemical additive to be added to the container in order to control the process related to the aerated fluid based at least partly on the gas volume fraction of the aerated fluid that is determined, or some combination thereof.

The at least one acoustic transmitter 22 and the at least one acoustic receiver or receiver probe 24 are devices that are known in the art and the scope of the invention is not intended to be limited to any particular type or kind either now known or later developed in the future.

By way of example, and consistent with that described herein, the functionality of the signal processor 26 may be implemented using hardware, software, firmware, or a combination thereof, although the scope of the invention is not intended to be limited to any particular embodiment thereof. In a typical software implementation, the signal processor would be one or more microprocessor-based architectures having a microprocessor, a random access memory (RAM), a read only memory (ROM), input/output devices and control, data and address buses connecting the same. A person skilled in the art would be able to program such a microprocessor-based implementation to perform the functionality set forth in the signal processing block 26a, such as determining the gas volume fraction of the aerated fluid based at least partly on the speed of sound measurement of the acoustic signal that travels through the aerated fluid in the container, as well as other functionality described herein without undue experimentation. The scope of the invention is not intended to be limited to any particular implementation using technology now known or later developed in the future. Moreover, the scope of the invention is intended to include the signal processor being a stand alone module, as shown, or in the combination with other circuitry for implementing another module.

The implementation of the invention is shown and described by way of example in relation to different types and kinds of aerated fluid, liquid, etc., including aerated concrete, paint and coatings, cosmetics; and the scope of the invention is not intended to be limited to any particular type or kind of aerated fluid, liquid, etc. either now known or later developed in the future.

It is also understood that the apparatus 20 may include one or more other modules, components, circuits, or circuitry 28 for implementing other functionality associated with the apparatus that does not form part of the underlying invention, and thus is not described in detail herein. By way of example, the one or more other modules, components, circuits, or circuitry 28 may include random access memory, read only memory, input/output circuitry and data and address buses for use in relation to implementing the signal processing functionality of the signal processor 26, or devices or components related to mixing or pouring concrete in a ready-mix concrete truck or adding chemical additives, etc.

FIG. 1b shows a flowchart generally indicated as 29 of a method comprising steps 29a, 29b and 29c for implementing some embodiments of the present invention, including a step 29a for receiving a signal containing information about an acoustic signal that is generated by at least one acoustic transmitter, that travels through an aerated fluid in a container, and that is received by at least one acoustic receiver arranged in relation to the container, including inside the container; and a step 29b for determining the gas volume fraction of the aerated fluid based at least partly on the speed of sound measurement of the acoustic signal that travels through the aerated fluid in the container. The method may also comprise a step 29c for providing an output signal containing information about the gas volume fraction of the aerated fluid or liquid, or containing information to control a process being performed on the aerated fluid or liquid, or containing information about a chemical additive to be added to the container in order to control the process related to the aerated fluid based at least partly on the gas volume fraction of the aerated fluid that is determined, or some combination thereof.

The method is also intended to include one or more steps for implementing other features of the underlying invention disclosed herein.

FIGS. 2a, 2b, 2c (CCS-0035): New Techniques for Determining GVF (Gas Volume Fraction) in Flotation Tanks and Columns FIGS. 2a, 2b and 2c show new techniques for determining GVF (gas volume fraction) in flotation tanks and columns, according to some embodiments of the present invention. In general, this new approach is based on insertion probes and uses no waveguide. The advantage of this technique is that it samples a larger portion of the fluid than the waveguide approach, as well as reducing the part count and complexity.

For example, FIG. 2a shows a flotation tank 30 having aerated fluid or liquid therein generally indicated as 32 with air or bubbles 32a and at least one acoustic transmitter probe 34 with a transmitter 34a and at least one acoustic receiver probe 36 with a receiver 36a both arranged inside the flotation tank 30. The at least one acoustic transmitter probe 34 and at least one acoustic receiver probe 36 are separated by the distance D, as shown, and are inserted into the tank at the same height. In FIG. 2a, the one probe 34 acts as an acoustic source (indicated by the curved waveform path labeled as 38) and the other probe 36 acts as an acoustic receiver. The acoustic source 34 emits a frequency in the proper frequency range (~<1000 Hz) whereby the entrained air 32a modifies the sound speed in the fluid 32. By way of example, this acoustic signal 38 can be generated by driving a piezoelectric material and/or a mechanical impulse, consistent with that described below. The acoustic signal along path 38 travels through the aerated fluid 32 and is received by the receiver probe 36. The elapse time between the pulse generation and detection is recorded. The sound velocity in the aerated fluid is then determined knowing the distance D between the probes 34, 36.

Alternatively, the gas volume fraction (GVF) could be determined by measuring the sound speed using 2 or more receiving probes and a dedicated acoustic source. In FIG. 2b, the flotation tank 30 has aerated fluid or liquid therein 32 and the at least one acoustic transmitter probe 34 and two or more acoustic receiver probes 36', 36" both arranged inside the flotation tank 30.

The scope of the invention is intended to include the acoustic source 34a being arranged inside the tank 30 as shown in FIGS. 2a, 2b or outside the tank 30 as shown in FIG. 2c. If situated outside the tank 30, the acoustic signal 38 could be generated by driving the tank wall 30a. In FIG. 2c, the flotation tank 30 has aerated fluid or liquid therein 32 and the at least one acoustic transmitter or source 34a arranged on an outside wall of the flotation tank 30 and the two or more acoustic receiver probes 36', 36" arranged inside the flotation tank 30.

Figure 3A:
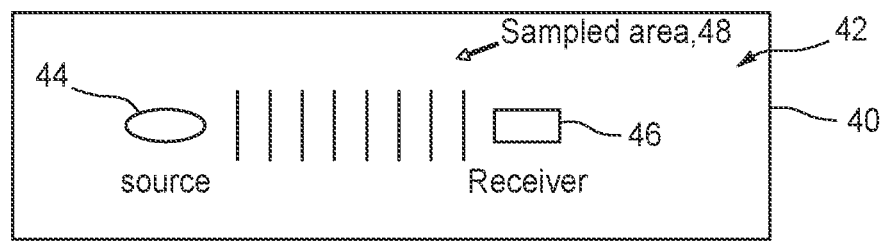
FIG. 3*a* is a diagram of a container having a wet concrete therein and at least one acoustic source and at least one acoustic receiver all arranged inside the container, according to some embodiments of the present invention.
Figure 3B:
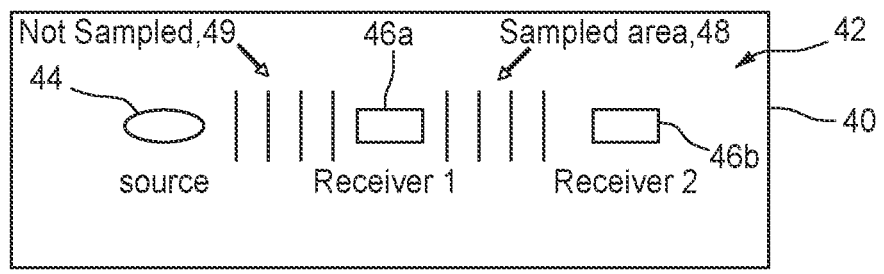
FIG. 3*b* is a diagram of a container having a wet concrete therein and at least one acoustic source and two or more receivers all arranged inside the container, according to some embodiments of the present invention.
Figure 3C:
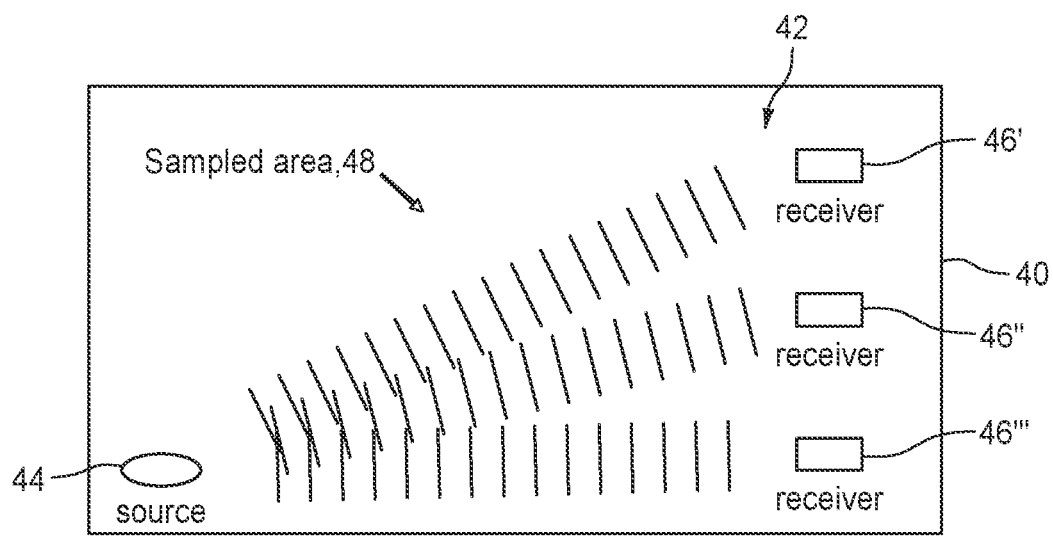
FIG. 3*c* is a diagram of a container having a wet concrete therein and at least one acoustic source and three or more receivers all arranged inside the container, according to some embodiments of the present invention.

FIGS. 3a, 3b, 3c (CCS-0037): New Techniques to Measure GVF (Gas Volume Fraction) in Wet Concrete FIGS. 3a, 3b and 3c show new techniques to measure GVF (gas volume fraction) in wet concrete (pre-cured) that can be used to control the entrained air present in the wet concrete, according to some embodiments of the present invention.

In FIG. 3a, any arbitrary container like element 40 may have wet concrete therein generally indicated as 42 and two probes 44, 46, such as at least one acoustic source 44 and at least one acoustic receiver 46, may be inserted in the container 40. The probes 44, 46 are inserted at a known distance apart, then the source probe 44 is activated and an acoustic signal is generated so that the propagation time to the receiver probe 46 can be measured in the sample area 48. The SOS is then determined and the GVF can be calculated.

The other number and position of sources and receivers (more likely) can also be varied to sample more of the concrete volume, according to some embodiments of the present invention. For example, FIG. 3b shows an embodiment in which the container 40 having the wet concrete therein 42 and the at least one acoustic source 44 and two receiver 46a, 46b arranged inside the container 40. FIG. 3b shows the sampled area 48 and a not sampled area 49. FIG. 3c shows an embodiment in which the container 40 has the wet concrete therein 42 and the at least one acoustic source 44 and three or more receivers 46', 46", 46''' arranged inside the container 44.

Determining the GVF by measuring the speed of sound can provide fast an accurate data. Also the SOS measurement system can be very flexible and can easily be configured to work with different concrete containers and sample particular volumes.

CCS:0033: Impact and Coherent Noise Source for Acoustic Speed of Sound Measurements FIGS. 4a, 4b(i), 4b(ii), 4c, 4d show new techniques for impact and coherent noise sources for acoustic speed of sound measurements, including such acoustic speed of sound measurements used in relation to SONAR-based technology as well as other sound receiving technology as shown and described herein. By way of example, the SONAR-based entrained air meter may take the form of SONAR-based meter and metering technology disclosed, e.g., in whole or in part, in U.S. Pat. Nos. 7,165,464; 7,134,320; 7,363,800; 7,367,240; and 7,343,820, all of which are incorporated by reference in their entirety.

In particular, in many cases it may also be necessary to purposefully generate the acoustics if they do not exist naturally; this has the benefit of assuring the acoustics are present along with potentially improving the signal-to-noise of the measured signal. FIG. 4a shows a general concept according to some embodiments of the present invention, where a pipe or other container 50 has at least one acoustic source 52 for providing an acoustic signal generally indicated by waveform 54 through a material flowing in the pipe 50, and where the acoustic signal is sensed by SONAR-based technology 56 or other sound receiving technology as shown and described herein.

This disclosure describes several methods for achieving tailored acoustic generation externally to the pipe.

Two general approaches to acoustic generation can be taken:

First, a general broadband signal generation will permit multiple frequencies to be generated and detected by the sensor and improved detected signal accuracy. This approach has the advantage of potentially being simple to implement, however will not be very efficient.

One of the best ways to generate a broadband frequency spectrum is through a step impact. This impact will in effect start as a rough square wave excitation that will consist of a large variety of spectral components. This impact can occur on the outer surface of the pipe or container with the generated acoustic frequencies traveling into the materials within and down along the pipe or container.

FIGS. 4b(i) and 4b(ii) show a couple of methods of achieving this impact through the use of a piezoelectric actuator generally indicated as 60, 70. In each case, a piezoelectric element 62, 72 pushes a striker 62, 72 into a pipe or container surface 50a to create the impact. In FIG. 4b(i), the PZ actuator 60 provides an acoustic signal with a broadband frequency spectrum through a material flowing in the pipe or container. The advantage of using such a piezoelectric (PZ) element 62, 72 is that they can be run using very little current, react very quickly and can impart a large amount of force onto the outer surface 50a of the pipe 50 (FIG. 4a) through the striker 64, 74. In FIG. 4b(i), the striker 64 is driven by the PZ element 62 into the pipe surface 50a, while in FIG. 4b(i) a lever or support arm 76 is used and the PZ element 72 pulls the striker 74 into contact with the pipe surface 50a.

Other methods of activation of the striker 64 or 74 can also be envisioned using technology now known, including a electro-mechanical striker using an electrically activated coil and magnet or other methods. The scope of the invention is also intended to include methods or techniques of activation of a striker like 64 or 74 later developed in the future.

Figure 4C:
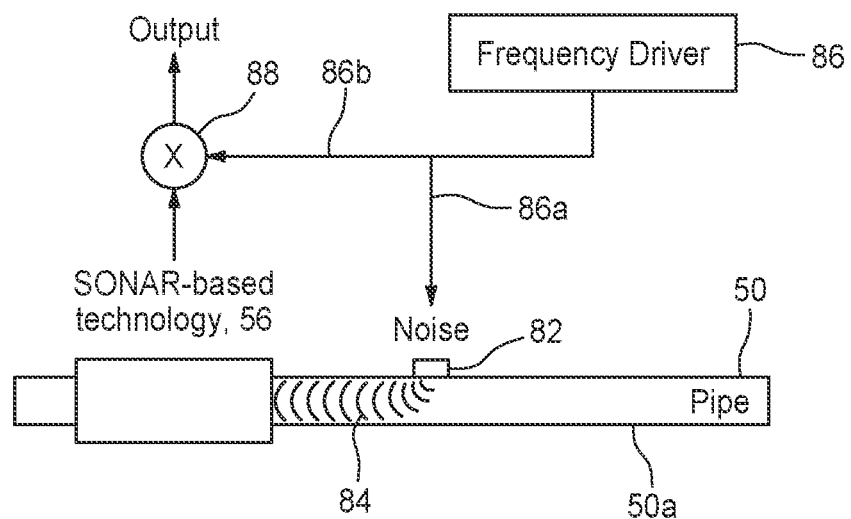
FIG. 4*c* is a diagram of a pipe surface having at least one acoustic source for providing an acoustic signal with individual frequencies spectrum through a material flowing in the pipe, according to some embodiments of the present invention.
Figure 4D:
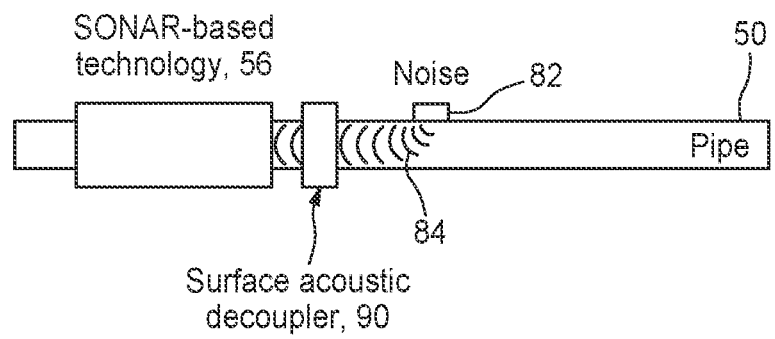
FIG. 4*d* is a diagram of a pipe surface having at least one acoustic source for providing an acoustic signal through a material flowing in the pipe, and also having a surface acoustic decoupler, according to some embodiments of the present invention.

As shown in relation to FIGS. 4c and 4d, a second approach to acoustic signal generation is to generate individual frequencies that can be seen by the sensor or receiver, such as the SONAR-based technology 56. This approach requires that a multiple of these separate frequencies be generated; however, it is a much more efficient system than that mentioned in the first method described about in relation to FIGS. 4a, 4b(i) and 4b(ii)1. In this technique, a noise source or device 82 is used in a different method to create acoustic signals generally indicated by curved lines 84 within the pipe or container 50. The noise device may take the form of an electrical actuator such as a thin piezoelectric element (PZ) such as PVDF, that can be used to directly inject the acoustic frequency into the pipe 50. The actuator 82 may be attached to the surface 50a of the pipe or container 50 upstream or downstream from, e.g., the SONAR-based sensor technology 56. In FIG. 4c, a frequency driver 86 provides a frequency driver signal along signal path 86a to the noise device 82. The frequency driver 86 also provides the frequency driver signal along signal path 86b to a junction node 88 that receives a sensed signal from the SONAR-based technology 56, and provides an output signal for processing consistent with that shown and described herein. The general principles related to FIG. 4a for sensing applies to this embodiment, as well. In addition, a coherent detection scheme on the SONAR-based sensor technology 56 can be used to vastly improve the signal-to-noise of the detected signal.

Embodiments are also envisioned in which the system would run with multiple frequencies, implemented either simultaneously or individually. This multiple frequency scheme can be helpful to give multiple points for determination of the speed of sound in the materials. Additionally, Embodiments are also envisioned in which acoustics are used on both side of the SONAR-based sensor technology 56. In this case, two noise devices may be installed on the pipe or container 50. The desired for this arrangement may be mitigated if a suitable reflector is located on the opposite side of the SONAR-based sensor technology 56 from the noise source 82.

Embodiments are also envisioned in which alternative detection and excitation schemes may be used such as swept sine or pseudo-random encoding.

Embodiments are also envisioned in which an additional precaution may also be taken to help improve the detection of the speed of sound in the materials in the pipe versus the pipe itself. As the noise signals are injected into the pipe or container 50 and the inter-pipe materials, some of the noise will travel along the pipe or container 50 itself in the form of surface mode or pipe modes. The speed this noise travels is not what is desired and may interfere with the measurement of the speed of sound of the intra-pipe materials. To remove or greatly dampen these unwanted signals in the pipe, a surface acoustic decoupler 90 can be used. This surface acoustic decoupler 90 is configured to wrap around and to attach to the outer surface 50a of the pipe or container 50 between the noise source 82 and the SONAR-based sensor technology 56 as shown in FIG. 4d. It may be designed to be acoustically matched to the material of the pipe or container 50 and serves to dissipate the acoustic signals traveling in the pipe or container 50 itself.

CCS-0045: Non-Intrusive Static Pressure Measurement for Input to Gas Void Fraction Calculation

A. Introduction

The known SONAR-based technology includes a gas volume fraction meter (known in the industry as a GVF-100 meter) that directly measures the low-frequency sonic speed (SOS) of the liquid or slurry flowing through a pipe. By way of example, the SONAR-based entrained air meter may take the form of SONAR-based meter and metering technology disclosed, e.g., in whole or in part, in U.S. Pat. Nos. 7,165,464; 7,134,320; 7,363,800; 7,367,240; and 7,343,820, all of which are incorporated by reference in their entirety. Using the Wood's equation, the volume percent of any gas bubbles or the gas void fraction (GVF) is determined from the measured SOS. The Wood's equation requires several other inputs in addition to the measured SOS of liquid/gas mixture. One of the additional inputs in particular, the static pressure of the liquid/gas mixture, can be very important for an accurate calculation of the GVF. To a first order, if the static pressure used for the GVF calculation differs from the actual static pressure of the liquid/gas mixture, then the calculated GVF may typically differ from the actual GVF by 1% as well. For example:

Static Pressure used for GVF calculation=20 psia
Calculated GVF=2%
Actual Static Pressure=22 psia
Static pressure error=22/20−1=0.1=10%

Actual GVF=2%×(1+0.1)=2.2% (10% error)

In many cases, the static pressure of the liquid/gas mixture is available through existing process plant instrumentation. In this case, the measured static pressure can be input directly to the GVF calculation through, e.g., an analog 4-20 mA input in the SONAR-based gas volume fraction transmitter (e.g. GVF-100 meter). Alternatively, a correction to the calculated GVF can be made in the customer DCS for any variation from the fixed pressure that was used to originally calculate the GVF.

In other cases, a static pressure transmitter can be added to the process plant specifically to measure the static pressure used for the GVF calculation. The measured pressure can either be input to the SONAR-based gas volume fraction transmitter (e.g., GVF-1200) or correction made in the DCS as described above.

Occasionally, a the SONAR-based gas volume fraction meter (e.g., GVF-100) may be installed at a location in the process that does not already have a static pressure gauge installed and it is impractical to add one. This could be a location where there is no existing penetration of the pipe to sense the pressure and it would be difficult or expensive to add one. In the case, where a traditional pressure gauge is not available and it is desirable to have a static pressure measurement the following description of a non-intrusive (clamp on) static pressure measurement could be used.

B. Description

For example, according to some embodiments of the present invention, a non-intrusive static pressure measurement may be sensed using traditional strain gauges integrated into the sensor band of the SONAR-based gas volume fraction sensing technology (e.g. the known GVF-100 meter). As the static pressure inside the pipe changes, the static strain on the outside of the pipe also changes. Using a thin-wall assumption for simplicity (t/R<10, where t is the wall thickness and R is the radius) the tangential strain due to internal static pressure is:

$$\varepsilon = \frac{pR}{Et},$$

where ε is the tangential strain (inch/inch), R is the radius (inch), E is the modulus of elasticity (lb/in2) and t is the wall thickness (inch). The radius, wall thickness and modulus is generally known, or at least constant and so if the tangential strain is measured the internal static pressure can be determined.

By way of example, according to one embodiment of the present invention, four strain gauges could be arranged on the sensor band of the SONAR-based gas volume fraction sensing technology (e.g. the known GVF-100 meter) in a Wheatstone bridge configuration to maximize strain sensitivity and minimize temperature effects. In this case, the sensitivity assuming a strain gauge factor of 2, the sensitivity is approximately 13 µV/µε, where V is volts. Assuming a 4-inch schedule 40 carbon steel pipe, a one psi change in pressure would cause a 4 µV change in Wheatstone bridge output. This sensitivity would increase for larger diameter pipes which generally have a smaller t/R.

The integrated pressure gauge could be calibrated in-situ for best accuracy, but it may be sufficient to normalize the pressure output to a certain know state then use the tangential strain formula above with know pipe parameters to calculate the pressure from the measured strain.

Figure 5:
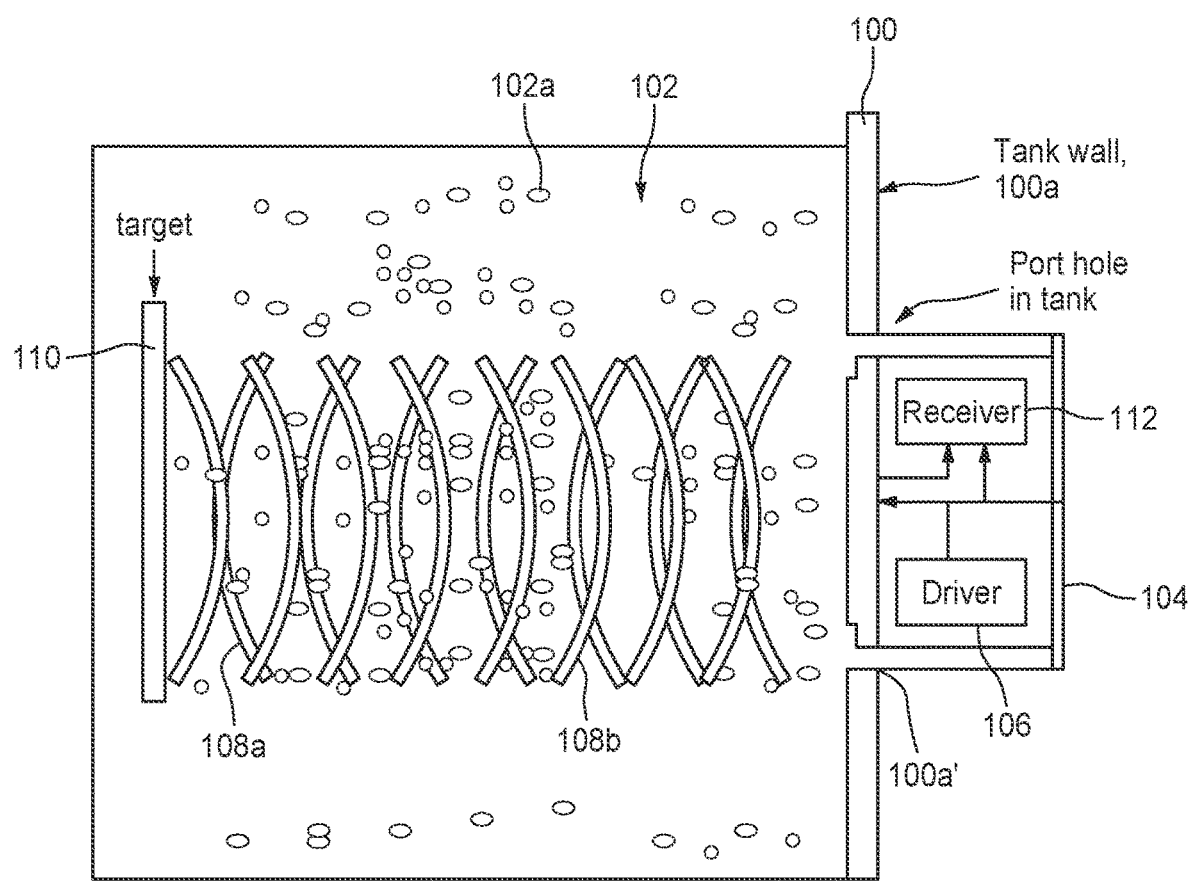
FIG. 5 is a diagram of a tank having aerated fluid or liquid therein of a paint or coating, and having a driver arranged on the tank for providing an acoustic signal, a target arranged in the tank for reflecting the acoustic signal, and a receiver arranged on the tank for receiving the reflected acoustic signal, according to some embodiments of the present invention.

FIG. 5 (CCS-0046): Paint and Coating Entrained Air Measurement

It is known in the prior art that, during the dispersion process, when forming paints and coatings, typically a grinding circuit is used to reduce the size of pigmentation particles. There are a number of grinding methods used to accomplish this but one common piece of hardware is the mixer grinder. In this method, a mixing blade is inserted into the vat of paint and spun at a relatively high RPM. Shearing is developed between particles and the blade as well as between particles and particles resulting in a reduction in the particle size. The efficiency of this process can be negatively affected by the air entrained in the fluid due to the rotating blade. Typically, defoaming chemicals are added to the vat to reduce levels of entrained air, but there is a need or desire in the industry to measure the amount of entrained air within the vat and minimize the use of defoaming chemicals.

According to some embodiments of the present invention, a technique is provided to measure the entrained air within a vat of paint or coating fluid, based at least partly upon measuring the sound speed within the fluid. The sound speed can then be used to determine the entrained air levels in the paint or coating fluid.

For example, FIG. 5 shows a tank or vat 100 having aerated fluid or liquid therein 102 of paint or coating with air bubble or entrained air 102a, and having an acoustic driver/receiver 104 with a driver 106 arranged on the tank or vat 100 for providing an acoustic signal generally indicated by waveform 108a, a target or reflector 110 arranged in the tank or vat 100 for reflecting the acoustic signal 108, and a target or reflector 110 arranged on the tank for providing a reflected acoustic signal generally indicated by waveform 108b, according to some embodiments of the present invention. To measure the sound speed according to the present invention, the acoustic driver or source 106 may be attached to the side wall 100a of the tank or vat 100 containing the paint or coating 102. This source can operate through the wall, or be inserted in port generally indicated as 100a' that allows contact with the fluid. In this latter case, a suitable means of generating low frequency acoustics by driving a diagram may be then used to propagate a sound signal into the fluid, and appropriate means may include pressure, and or mechanical/electrical excitation of the diaphragm. The stationary target or reflector 110 situated in the tank or vat 100 serves as an acoustic reflector whereby the sound is redirected back to the driver/receiver 104. Within the acoustic receiver/driver 104, a receiver 112 may be situated to pickup the returning reflected acoustic signal 108b. The receiver 112 detects the pressures associated with the returning signal 108b and converts them into an electrical output. Such a receiver could be fabricated out of PVDF or other appropriate materials or methods capable of detecting pressure signals, using technology now known or later developed in the future. Since the receiver 112 measures the excitation signal and the return signal, the time to traverse a known distance within the fluid and reflect back off the target can be determined. This time, the sound speed of the fluid, can be used to determine the entrained air. One such method is to use Wood's Equation, which are known in the art, although the scope of the invention is intended to include other type or kind of techniques to determine the same, both now known and later developed in the future.

One advantage of the present invention is that the use of defoaming chemicals can be minimized, based at least partly on measuring the amount of entrained air within the vat.

FIGS. 6a-6e (CCS-0047): Real-Time Measurement and Monitoring of Air Content

Air is a very important component of many materials, such as viscous liquids, slurries or solids. In particular, air is a critical ingredient when making concrete because it greatly improves the cured product damage resistance to freeze/thaw cycles. Chemical admixtures are typically added during mixing to create, entrain and stabilize billions of small air bubbles within the concrete. However, the entrained air in concrete has the disadvantage of reducing strength so there is always a trade-off to determine the right amount of air for a particular application. Typically, air content is required to be in the range of 5-8% by volume.

FIGS. 6a to 6e show new techniques for real-time measurement and monitoring of air content, e.g., in concrete, including a method and apparatus to measure the volumetric air content in an aerated liquid or slurry in real-time, which could include for example concrete during the mixing process. In particular, the present invention provides for the measurement of air content on a ready-mix truck (or fleet of trucks) during mixing, transport and even after the concrete is dumped at the job site, as well as the monitoring of the air content from several trucks at a central monitoring station. Since the measurement may be made during mixing and monitored by a skilled concrete process engineer, the mix parameters can be changed to optimize and control the air content improving concrete quality.

The air content of concrete in a ready-mix truck may be measured by determining the speed of sound of the concrete while it is in the truck mixing drum. FIG. 6a shows a graph that indicates the relation between the speed of sound traveling in a material and the gas volume fraction of the material, and shows how the speed that sound propagates through concrete can be significantly affected by the amount of air by volume contained in the concrete.

FIGS. 6b and 6c show a ready-mix concrete truck 140 having a concrete mixer drum 142 with a bolted hatch cover 150. In FIG. 6c, the hatch cover 150 has an acoustic projector and receiver pair generally indicated by 152 separated by a distance D, according to some embodiments of the present invention. The acoustic projector and receiver pair 152 may include an acoustic projector 154 and an acoustic receiver 156. The speed of sound may be measured using the acoustic projector and receiver pair 152. In operation, the projector/receiver pair 150 is wetted by concrete in the concrete mixer drum 142 as attached to the drum inspection hatch 150 as shown in FIGS. 6c, 6d, 6e. In FIG. 6c, the projector/receiver pair 152 could be installed through the bolted hatch cover 150 so they are inside the mixer drum. Alternatively, in FIGS. 6d, 6e the projector/receiver pair 152 could be installed on a curved hatch plate 151 configured to form a cavity generally indicated as C, where the projector/receiver pair 152 is attached so the sensors are still exposed to the concrete inside the drum but located outside the original location of the drum wall, as shown in FIGS. 6d and 6e. The hatch plate 151 may be configured so that the cavity C has corners rounded/tapered so no air will be trapped when rotating from top to bottom. The hatch plate 151 may be bolted to the drum cover 150', as shown in FIG. 6d, although the scope of the invention is not intended to be limited to the manner of coupling the hatch plate 151 and hatch cover 150.

As the mixer drum 142 (FIG. 6b) turns the projector/receiver pair 152 will turn with it. Because the speed of the drum rotation is relatively slow (~1 rpm) the concrete will tend to stay in place with only a small amount of cascading/mixing. This will result in a relative motion between the projector/receiver pair 152 and the concrete, so the concrete will effectively flow through the gap indicated by arrow G between the projector/receiver pair 152. The flow of concrete through the gap G between the projector/receiver pair 152 insures that the air content values measured will be representative of the entire mix.

By way of example, the hatch cover 150 could be purchased from the manufacturer, instrumented with the projector/receiver (and other associated hardware) according to the present invention, and then delivered to the end customer. This would allow system checks, calibration and any other configuration setup to be conducted in a controlled environment before the end customer receives the system.

In operation, the acoustic projector 154 sends an acoustic signal indicated by the curved waveform path 154a, which could be a frequency-modulated pulse, an impulse (such as what would be generated by a hammer strike) or some other type of acoustic signal, consistent with that set forth above. The acoustic signal along the curved waveform path 154a will travel through the concrete at the speed of sound and eventually reach the acoustic receiver 156. The speed of sound of the concrete is then determined by measuring the first arrival of the acoustic signal along the curved waveform path 154a, by cross-correlating the transmitted and received signals or some other signal processing technique known in the art.

In addition to the projector/receiver pair 152, an additional required component is an electrical power source (not shown). The power source could be a long-life battery, a rechargeable battery pack, a module that generates an electrical signal from the mechanical energy of the rotating drum or anything else that can supply sufficient electrical power to the projector/receiver and associated electronics.

Additional electronic components may be used, including a microprocessor, a wireless transmitter, a local display and a communications module. For example, the purpose of the microprocessor may be used to generate and control the acoustic signal sent by the acoustic projector 154, to measure the signal received at the acoustic receiver 156 and processes the data to determine the speed of sound and thus the air content, consistent with that disclosed herein. Additionally, the wireless transmitter may be used to send the air content value to a local display and/or communications module on the ready-mix truck 140. The communications module may also send the air content value via cell phone link, satellite or other communication system to a central monitoring location, such as the central dispatcher or process engineer for the company that operates the mixer truck. At that point, the air content of a fleet of ready-mix concrete trucks 170, 172, 174, 176 could be monitored by a central monitoring station 180 to determine if adjustments may be required. The ready-mix concrete truck may be adapted with a printer device for providing a print-out or electronic record of the air level made as a record of the air content as the concrete was being poured at the job site.

Embodiments are also envisioned according to the present invention wherein the projector/receiver pair 152 may also be mounted directly on a chute that is used to pour the concrete. In this embodiment, the air content of the concrete would be continuously measured as the concrete flows down the chute through the gap G between a suitably arranged projector/receiver pair.

Embodiments are also envisioned according to the present invention wherein the air content system could be a package such that the projector/receiver is inserted into the concrete as it is being poured up to the point where curing has not progressed enough so that the concrete is still workable.

FIGS. 7a to 7c (CCS-0048): Gas Volume Fraction Meter for Bulk Fluids

FIGS. 7a to 7c show new techniques for measuring the speed of sound in a bulk fluid with entrained air or gas to determine the gas-volume-fraction (GVF), including an approach that utilizes active acoustic probing a medium using an array of transmitters and receivers to determine both the speed of sound in a bulk, nominally non-flowing medium. The approach is also extendable to other applications including other flows.

FIG. 7a shows a batch tank 200 having a transmitter array 202 and a receiver array 204 according to some embodiments of the present invention. Whereas other known techniques or configurations have utilized multiple 'direct' pressure monitoring points to pick-up ambient noise in the flow stream and 'sonar' type processing to detect both the axially traveling bulk fluid noise and acoustic noise signals, the approach according to the present invention uses active acoustic generation via the transmitter array 202 (single frequency, chirped or noise-like) which is coupled through the medium to the receiver array 204.

One key aspect of the approach is the ability to make measurements over a series of acoustic paths formed between the transmitter array 202 and the receiver array 204. This has signal to noise and measurement averaging advantages which may be important in certain applications involving slurries that are not homogeneous on a macro scale. The basic concept is illustrated in FIG. 7b, where the transmitter array 22 includes 13 transmitters 202a, 202b, 202c, ..., 202m, and where the receiver array 204 includes 13 receivers 204a, 204b, 204c, ..., 204m. The embodiments is described by way of example using 13 transmitter and receivers; however, the scope of the invention is not intended to be limited to the number of transmitters or the number of receivers. The configuration provides for multiple path interrogation at each measurement point: i.e., each receiver 204a, 204b, 204c, ..., 204m can be used to detect the signal emitted from each transmitter 202a, 202b, 202c, ..., 202m. Selectively encoding each transmitter 202a, 202b, 202c, ..., 202m with a different frequency, slice of spectrum, chirp/modulation characteristic, would allow each channel to be independently analyzed. Alternatively, the transmitters 202a, 202b, 202c, ..., 202m could be energized with pseudo noise sources, and delay-correlation techniques used to detect the transit time for each transmitter-to-receiver path. This provides N×N independent paths through the medium in question. As illustrated in FIG. 7b.

FIG. 7c illustrates a circular/ring based sensor for immersion in bulk fluid, according to some embodiments of the present invention. In this case, a mounting ring 210 has a transmitter and receiver array formed by a ring of transponders T1, T2, ..., Ti, ..., TN (transmit & receive) positioned around the mounting ring 210. This ring can be placed/immersed in a batch/bulk fluid tank/reservoir and used to provide a multi-path acoustic SOS determination. The paths between all transponders spaced diametrically opposite each other provide a reference measurement, whereas those on an off-diameter path of the ring will provide diversity in measurement length, etc.

FIGS. 8a-8d (CCS-0051): Additional Real-Time Measurement and Monitoring of Air Content FIGS. 8a to 8d relate to another embodiment for measuring the speed of sound in aerated concrete.

Under certain conditions of acoustic medium and sound source, the sound propagation will have very little or insignificant directional properties. That is, a sound coming from a source will propagate equally in all directions from the source.

One type of sound source as an example is a free-edged baffled circular piston (a circular-faced piston surrounded by a rigid plane surface) with time-harmonic oscillation, the geometry shown in FIG. 8a. In this case, the peak sound radiation occurs along the piston axis ($\theta$=0). The amplitude directivity factor, $D(\theta)$, which is the ratio of sound pressure at distance r from the piston center and direction $\theta$ from the piston axis to the sound pressure at the same distance r on the piston axis is defined as:

$$D(\theta) = \frac{P(r, \theta)}{P(r, 0)} = \frac{2J_1(ka\sin\theta)}{ka\sin\theta},$$

where P is the amplitude of the harmonic pressure wave, $J_1$ is the first-order Bessel functions of the first kind and a is the piston radius. The wavenumber, k is defined as:

$$k = \frac{\omega}{c},$$

where $\omega$ is the harmonic oscillation frequency and c is the speed of sound. $D(\theta)$ for a 1.5" diameter piston and 80 ft/sec speed of sound is shown in FIG. 8b. Note that for 100 Hz and $\theta$=90°, the amplitude of the pressure signal will be nearly 100% of the amplitude of the pressure signal along the piston axis ($\theta$=0°). Even at 500 Hz, the directivity factor at $\theta$=90° is around 0.6 (60%) or 4.4 dB.

Because of the relatively minor impact on the direction of sound propagation when using a small diameter piston at low frequency, sound could be generated along a plane surface, and measured by a receiver located along the same plane surface. FIG. 8c shows one example in which a wall of a concrete mixer 250 for mixing concrete 251 is configured with a sound source 252 and a sound receiver 254. A piston or other sound source could be installed on the wall of the tank and the signal received by one or more pressure sensors installed on the same wall some distance away (see FIG. 8c), consistent with that described herein. FIG. 8d shows another example, where one unit or probe 260 would have integrated therein both a sound 262 source and one or more pressure sensors 264. The unit or probe 260 could then be inserted through the wall of a concrete mixer so it is in make contact with the concrete.

SONAR-Based Parts of CCS-0037 and 0040-1

According to some embodiments of the present invention, the speed of sound in the aerated fluid, including concrete, may be measured using receivers based at least partly on SONAR-based entrained air meter and metering technology. In such embodiment, and consistent with that described in relation to FIGS. 4a through 4d above, the SONAR-based entrained air meter and metering technology can be arranged on a processing container, tank, column, mixer, vat, tube or pipe, and configured to receive the acoustic signal and provide a corresponding SONAR-based signal containing information about the acoustic signal generated by the at least one transmitter. In such embodiments, the durability of concrete may be enhanced by entraining air in the fresh concrete mix, and new techniques for using entrained air measurement at the mixer to control concrete admix based at least partly on the same are described below according to some embodiments of the present invention.

CCS-0037

For example, this aspect of the present invention proposes to include a wet concrete being poured into a tube. The tube may comprise two SONAR-based PVDF sensors attached to the outside of the tube, one near the top of the tube and the other near the bottom of the tube. A sound or acoustic signal may be created at the top and/or the bottom of the tube. The propagation time of the sound or acoustic signal between the two sensors is measured, the speed of sound (SOS) may be determined and the GVF may be calculated. Also more than 2 sensors can be used to determine the SOS (or just one if a distant reflection can be taken advantage of).

For larger concrete samples, the tube, with an attached sound source, can be inserted into the concrete and the SOS measured.

In some cases, the ambient sound may be loud enough that a sound source is not needed, and the scope of the invention is intended to include the use of such loud sounds alone and in combination with a created sound.

The SONAR-based entrained air meter and metering technology are known in the art and may take the form of a SONAR-based meter disclosed, e.g., in whole or in part in U.S. Pat. Nos. 7,165,464; 7,134,320; 7,363,800; 7,367,240; and 7,343,820, all of which are incorporated by reference in their entirety. The SONAR-based entrained air meter and metering technology is capable of providing a variety of information, including the pure phase density and pure phase liquid sound speed is known, such that the GVF can be determined by measuring the speed of sound and then applying the Woods Equation.

Determining the GVF by measuring the speed of sound can provide fast an accurate data. Also the SOS measurement system can be very flexible and can easily be configured to work with different concrete containers and sample particular volumes.

CCS-0040

Further, another aspect of the present invention also proposes an entrained air measurement be made which the mix is in the mixer before release to the truck. This measurement can be realized by installing a SONAR-based entrained air meter, e.g., at the bottom of the mixer box. After the constituents have been added and mixed in the box for a sufficient time, but prior to release to the truck, a sample of concrete is released into the measurement unit. This can be accomplished through a suitable valve arrangement such as a knife valve. The measurement of the entrained air in the sample is then made. At that time the operator can modify the mix to bring it into specification if required, or release it into the truck if the level is within specification. This new technique according to the present invention will lead to improved quality control of the concrete as well as cost savings for the operator by eliminating out of specification batches.

Consistent with that described above, the SONAR-based entrained air meter and metering technology are known in the art and may take the form of a SONAR-based meter disclosed, e.g., in whole or in part in U.S. Pat. Nos. 7,165,464; 7,134,320; 7,363,800; 7,367,240; and 7,343,820.

The Scope of the Invention

While the invention has been described with reference to an exemplary embodiment, it will be understood by those skilled in the art that various changes may be made and equivalents may be substituted for elements thereof without departing from the scope of the invention. In addition, may modifications may be made to adapt a particular situation or material to the teachings of the invention without departing from the essential scope thereof. Therefore, it is intended that the invention not be limited to the particular embodiment(s) disclosed herein as the best mode contemplated for carrying out this invention.

What is claimed is:
1. Apparatus comprising:
a container (40) having an aerated fluid therein;
an array of acoustic transmitters (44) that is arranged in relation to the container having aerated fluid therein being processed and configured to generate acoustic signals that travel through the aerated fluid;
an array of acoustic receivers (46) that is arranged in the container and configured to receive the acoustic signals and provide a signal containing information about the acoustic signals generated by the array of acoustic transmitters, the array of acoustic receivers and the array of acoustic transmitters being separated by a known distance;
a signal processor (26) configured to:
receive the signal;
determine the gas volume fraction of the aerated fluid based at least partly on upon a speed of sound measurement of the acoustic signals that travel through the aerated fluid in the container, the signal processor being configured to determine the speed of sound measurement based at least partly on an elapsed or propagation time between generation and detection of the acoustic signals and the known distance between the array of acoustic transmitters and the array of acoustic receivers, wherein the signal processor is configured to receive signals containing information about the acoustic signals that are generated by the array of acoustic transmitters, that travel through the aerated fluid in the container, having each acoustic transmitter selectively encoded with a different frequency, slice of spectrum, chirp/modulation characteristic allowing each channel to be individually analyzed, that travel through the aerated fluid in the container, and that are received by the array of acoustic receivers; and
provide an output signal containing information about the gas volume fraction of the aerated fluid to control the entrained air in the aerated fluid being processed in the container, based upon the signal received, including for providing a chemical additive to the aerated fluid being processed in the container.

2. Apparatus according to claim 1, wherein the speed of sound measurement is based at least partly on at least one of the acoustic transmitters (44) and the acoustic receiver probes (46) being arranged at the same height in relation to the container (40).

3. Apparatus according to claim 1, wherein the speed of sound measurement is based at least partly on the acoustic transmitters (44) emitting the acoustic signals at a frequency in a proper frequency range so that entrained air modifies the speed of sound in the aerated fluid.

4. Apparatus according to claim 1, wherein the receivers (46) comprise two acoustic receivers arranged inside the container (40).

5. Apparatus according to claim 1, wherein the signal processor (26) is configured to provide the output signal for providing the chemical additive to the aerated fluid being processed in the container (40) which is a flotation tank in a flotation process.

6. Apparatus according to claim 1, wherein the apparatus comprises a concrete mixer (162) having the acoustic transmitters (44) and the acoustic receivers (46), and the aerated fluid comprised in the container (40) is part of a mixing process for making concrete which includes mixing concrete in a ready mix truck (140) or in a stationary concrete mixer box.

7. Apparatus according to claim 1, wherein the apparatus comprises a food processor having the acoustic transmitters (44) and the acoustic receivers (46), and the aerated fluid comprised in the container (40) is part of a food process which includes adding lysene for producing ice cream.

8. Apparatus according to claim 1, wherein the acoustic transmitters (44) are configured to generate acoustic signals by driving a piezoelectric material or a mechanical impulse.

9. Apparatus according to claim 1, wherein the acoustic transmitters (44) are arranged on the outside of the container (40).

10. Apparatus according to claim 1, wherein the acoustic transmitters (44) are arranged on the inside of the container (40).

11. Apparatus according to claim 1, wherein the apparatus comprises at least one of the acoustic transmitters (44) that is omnidirectional.

12. Apparatus according to claim 1, wherein the apparatus comprises the container (40) that is a flotation column or tank.

13. Apparatus according to claim 1, wherein the apparatus comprises a chemical additive device configured to receive the output signal, and also configured to add the chemical additive to the container (40) in order to control the entrained air in the aerated fluid in a closed loop system.

14. Apparatus according to claim 1, wherein the apparatus comprises a ready mix truck (140) and a drum inspection hatch (150) of the ready mix truck and at least one of the acoustic transmitters (44) and at least one of the acoustic receivers (46) take the form of a projector/receiver pair separated by a small distance and attached to the drum inspection hatch (150), wherein the projector/receiver pair is installed through the drum inspection hatch (150) so as to be inside the cavity of a mixer drum of the ready mix truck (140), or wherein the apparatus comprises a drum inspection hatch (150) which is configured to form a cavity and at least one of the acoustic transmitters (44) and at least one of the acoustic receivers (46) take the form of a projector/receiver pair separated by a small distance and attached to the drum inspection hatch (150) and the projector/receiver pair is installed in the cavity and exposed to the concrete inside the container (40) which is a mixer drum (142), or wherein the apparatus comprises a ready mix truck (140) and a drum inspection hatch (150) of the ready mix truck and at least one of the acoustic transmitters (44) and at least one of the acoustic receivers (46) take the form of a projector/receiver pair separated by a small distance and attached to the drum inspection hatch (150) and the apparatus comprises a wireless transmitter configured to provide a wireless signal containing information about an air content value of concrete in the container (40) to a local display and/or communications module on the ready mix truck (140).

15. Apparatus according to claim 14, wherein the gas volume fraction of the aerated fluid is based at least partly on multipath interrogation of each measurement point, where each acoustic receiver (46) is configured to detect a respective acoustic signal from each acoustic transmitter (44).

16. Apparatus according to claim 1, wherein the gas volume fraction of the aerated fluid determined is based at least partly on multipath interrogation of each measurement point, where each acoustic receiver is configured to detect a respective acoustic signal from each acoustic transmitter.

17. Apparatus according to claim 1, wherein the apparatus comprises at least one of the acoustic transmitters (44) that is arranged on the outside of the container (40) and operates through a wall of the container, wherein the apparatus comprises at least one of the acoustic transmitters (44) that is inserted in a port in a wall that allows contact with the aerated fluid, and wherein the apparatus comprises a diaphragm and at least one of the acoustic transmitters (44) that is configured to generate low frequency acoustics by driving the diaphragm, including by pressure or mechanical/electrical excitation, used to propagate a sound signal into the aerated fluid.

18. A method for determining a gas volume fraction for aerated fluids and liquids in a container (40) like a flotation tank, column, drum, tube, or vat, comprising:
provided the container (40) having an aerated fluid therein;
generating with an array of acoustic transmitters (44) acoustic signals that travel through an aerated fluid being processed in a container, including a flotation tank, a column, a drum, a tube, or a vat;
detecting with an array of acoustic receivers (46) arranged inside the container the acoustic signals generated;
separating the array of acoustic receivers (46) and the array of acoustic transmitters (44) by a known distance;
receiving a signal containing information about a gas volume fraction of the aerated fluid that is determined based upon a speed of sound measurement of the acoustic signals and depends on an elapsed or propagation time between generation and detection of the acoustic signals and the known distance, including receiving signals containing information about the acoustic signals that are generated by the array of acoustic transmitters, that travel through the aerated fluid in the container, having each acoustic transmitter selectively encoded with a different frequency, slice of spectrum, chirp/modulation characteristic allowing each channel to be individually analyzed, that travel through the aerated fluid in the container, and that are received by the array of acoustic receivers; and
determining an output signal containing information about the gas volume fraction of the aerated fluid to control the entrained air in the aerated fluid being processed in the container, based upon the signal received, including where the output signal contains information about providing a chemical additive to the aerated fluid being processed in the container.

* * * * *